(12) United States Patent
Abbott et al.

(10) Patent No.: US 11,037,032 B2
(45) Date of Patent: Jun. 15, 2021

(54) METHODS, SYSTEMS, AND MEDIA FOR DETECTING THE PRESENCE OF AN ANALYTE

(71) Applicant: Wisconsin Alumni Research Foundation, Madison, WI (US)

(72) Inventors: Nicholas Abbott, Madison, WI (US); Yankai Cao, Madison, WI (US); Victor Zavala Tejeda, Madison, WI (US); Huaizhe Yu, Madison, WI (US)

(*) Notice: Subject to any disclaimer, the term of this patent is extended or adjusted under 35 U.S.C. 154(b) by 162 days.

(21) Appl. No.: 16/148,614

(22) Filed: Oct. 1, 2018

(65) Prior Publication Data

US 2019/0108421 A1    Apr. 11, 2019

Related U.S. Application Data

(60) Provisional application No. 62/569,187, filed on Oct. 6, 2017.

(51) Int. Cl.
*G06K 9/00* (2006.01)
*G06K 9/46* (2006.01)
(Continued)

(52) U.S. Cl.
CPC ........... *G06K 9/6269* (2013.01); *G01N 21/27* (2013.01); *G01N 21/77* (2013.01); *G06K 9/0014* (2013.01); *G06K 9/00147* (2013.01); *G06K 9/209* (2013.01); *G06K 9/4647* (2013.01); *G06K 9/4661* (2013.01); *G06K 9/6257* (2013.01); *G06N 3/08* (2013.01); *H04N 5/232* (2013.01); *H04N 5/23229* (2013.01); *G01N 21/78* (2013.01)

(58) Field of Classification Search
CPC .............. G06K 9/0014; G06K 9/00147; G06T 7/0012; G06T 2207/30004
See application file for complete search history.

(56) References Cited

U.S. PATENT DOCUMENTS 6,284,197 B1    9/2001   Abbott
7,135,143 B2    11/2006  Abbott
(Continued)

OTHER PUBLICATIONS

Bedolla Pantoja, M.A., et al., Surface-controlled orientational transitions in elastically strained films of liquid crystal that are triggered by vapors of toluene. ACS applied materials & interfaces, 8(20):13114-13122, 2016.

(Continued)

*Primary Examiner* — Kenny A Cese
(74) *Attorney, Agent, or Firm* — Quarles & Brady LLP

(57) ABSTRACT

In accordance with some embodiments, methods, systems, and media for detecting the presence of are provided. In some embodiments, a method of detecting an analyte is provided, the method comprising: capturing an image of liquid crystals; determining one or more features based on the brightness of the pixels in the image; providing the one or more features to a trained support vector machine, wherein the support vector machine was trained using images captured of other liquid crystals when exposed to a first analyte and the other liquid crystals exposed to a second analyte; and receiving an indication from the support vector machine indicating whether the liquid crystals have been exposed to the first analyte.

17 Claims, 18 Drawing Sheets

(51) Int. Cl.
G06K 9/62 (2006.01)
G06N 3/08 (2006.01)
G01N 21/27 (2006.01)
H04N 5/232 (2006.01)
G06K 9/20 (2006.01)
G01N 21/77 (2006.01)
G01N 21/78 (2006.01)

(56) References Cited

U.S. PATENT DOCUMENTS

| | | | |
|---|---|---|---|
| 7,910,382 | B2 | 3/2011 | Abbott |
| 9,080,973 | B2 | 7/2015 | Abbott |
| 2011/0301441 | A1* | 12/2011 | Bandic .................. A61B 5/442 600/306 |
| 2014/0356970 | A1* | 12/2014 | Abbott .................. G01N 21/21 436/104 |
| 2015/0094219 | A1* | 4/2015 | Trowell ............ B01L 3/502715 506/9 |
| 2016/0178588 | A1 | 6/2016 | Abbott |
| 2017/0274378 | A1* | 9/2017 | Turner ................. B01L 3/5027 |
| 2018/0315193 | A1* | 11/2018 | Paschalakis ......... G06K 9/6269 |
| 2019/0271714 | A1* | 9/2019 | Kluckner ............. G01N 21/25 |
| 2020/0057880 | A1* | 2/2020 | Mizutani .................. G06T 7/62 |

OTHER PUBLICATIONS

Bradley, P. et al., Massive data discrimination via linear support vector machines. Optimization methods and software, 13(1):1-10, 2000.
Bungabong, M.L., et al., Using copper perchlorate doped liquid crystals for the detection of organophosphonate vapor. Sensors and Actuators B: Chemical, 148(2):420-426, 2010.
Cadwell, K.D., et al., Infrared spectroscopy of competitive interactions between liquid crystals, metal salts, and dimethyl methylphosphonate at surfaces. The Journal of Physical Chemistry B, 110(51):26081-26088, 2006.
Cao, Y., et al., Clustering-based preconditioning for stochastic programs. Computational Optimization and Applications, 64(2):379-406, 2016.
Chang, C.C. et al.,: a library for support vector machines. ACM transactions on intelligent systems and technology (TIST), 2(3):27, 2011.
Esteva A., et al., Dermatologistlevel classification of skin cancer with deep neural networks. Nature, 542(7639):115-118, Feb. 2, 2017.
Ferris, M. C., et al., Interior-point methods for massive support vector machines. SIAM Journal on Optimization, 13(3):783-804, 2002.
Hassanzadeh, A., et al., Liquid crystal sensor microchip. IEEE Sensors Journal, 12(5):1536-1544, 2012.
Ho, C. K., et al., Overview of sensors and needs for environmental monitoring. Sensors, 5(1):4-37, 2005.
Hunter, J.T. et al. Dynamics of the chemo-optical response of supported films of nematic liquid crystals. Sensors and Actuators B: Chemical, 183:71-80, 2013.
Hunter, J.T. et al., Adsorbate-induced anchoring transitions of liquid crystals on surfaces presenting metal salts with mixed anions. ACS applied materials & interfaces, 6(4):2362-2369, 2014.
Kang, J, et al. Nonlinear programming strategies on highperformance computers. In Decision and Control (CDC), 2015 IEEE 54th Annual Conference on, pp. 4612-4620. IEEE, 2015.
Miller, D.S. et al., Introduction to optical methods for characterizing liquid crystals at interfaces. Langmuir, 29(10):3154-3169, 2013.
Pal, S.K., et al., Effects of divalent ligand interactions on surface-induced ordering of liquid crystals. Chemistry of Materials, 22(19):5474-5482, 2010.
Robinson, S.E, et al., A liquid crystal-based passive badge for personal monitoring of exposure to hydrogen sulfide. Journal of occupational and environmental hygiene, 11(11):741-750, 2014.
Roling, L. T. , et al., Towards first-principles molecular design of liquid crystal-based chemoresponsive systems. Nature communications, 7:13338, 2016.
Shah, R.R., et al., Orientational transitions of liquid crystals driven by binding of organoamines to carboxylic acids presented at surfaces with nanometer-scale topography. Langmuir, 19(2):275-284, 2003.
Szilv'asi, T. et al., Design of chemoresponsive liquid crystals through integration of computational chemistry and experimental studies. Chemistry of Materials, 29(8):3563-3571, Apr. 7, 2017.
Wiederoder, M. S., et al., Graphene nanoplatelet-polymer chemiresistive sensor arrays for the detection and discrimination of chemical warfare agent simulants. ACS sensors, Nov. 2, 2017.
Yang, K.L., et al., Contact printing of metal ions onto carboxylateterminated self-assembled monolayers. Advanced Materials, 15(21):1819-1823, 2003.
Yang, K.L., et al., Mechanistic study of the anchoring behavior of liquid crystals supported on metal salts and their orientational responses to dimethyl methylphosphonate. the Journal of Physical Chemistry B, 108(52):20180-20186, 2004.
Yu, H., et al., Computational chemistryguided design of selective chemoresponsive liquid crystals using pyridine and pyrimidine functional groups. Advanced Functional Materials, Mar. 28, 2018.
Cao, Y, et al., Machine Learning Algorithms for Liquid Crystal-Based Sensors, ACS Sensors 2018 3 (11), 2237-2245, Oct. 5, 2018.

* cited by examiner

Classification accuracy with static (a) strategy (data partitioned over entire population).

| Round | Training Accuracy | Test Accuracy | DMMP Accuracy | $N_2$-Water Accuracy |
|---|---|---|---|---|
| 1 | 100.00 | 99.96 | 99.97 | 99.95 |
| 2 | 100.00 | 99.95 | 99.93 | 99.96 |
| 3 | 100.00 | 99.97 | 99.95 | 99.98 |
| 4 | 100.00 | 99.97 | 99.95 | 99.98 |
| 5 | 100.00 | 99.93 | 99.90 | 99.95 |
| Avg. | 100.00 | 99.95 | 99.93 | 99.96 |

SVM classifier accuracy at different times (with data set partitioned over entire population).

Classification accuracy with static (b) strategy (data partitioned by micro-wells).

| Round | Training Accuracy | Test Accuracy | DMMP Accuracy | $N_2$-Water Accuracy |
|---|---|---|---|---|
| 1 | 99.48 | 95.39 | 95.97 | 94.95 |
| 2 | 99.41 | 94.79 | 95.72 | 94.20 |
| 3 | 99.42 | 96.36 | 97.40 | 95.63 |
| 4 | 99.52 | 92.51 | 94.74 | 90.92 |
| 5 | 99.49 | 96.02 | 94.96 | 96.76 |
| Avg. | 99.46 | 95.00 | 95.75 | 94.45 |

Evolution of classification accuracy of SVM with data sets partitioned by micro-wells.

Effect of number of training samples on classification accuracy.

| % Training Samples | Test Accuracy | DMMP Accuracy | $N_2$-Water Accuracy |
|---|---|---|---|
| 20 | 87.47 | 87.15 | 87.68 |
| 40 | 91.41 | 91.03 | 91.65 |
| 60 | 93.08 | 93.41 | 92.85 |
| 80 | 95.00 | 95.75 | 94.45 |

FIG. 13

Performance of classification techniques on accuracy.

| Method | Test Accuracy | DMMP Accuracy | $N_2$-Water Accuracy |
|---|---|---|---|
| Linear SVM | 95.00 | 95.75 | 94.45 |
| Nonlinear SVM | 94.64 | 95.64 | 94.00 |
| Logistic classification | 92.99 | 93.98 | 92.35 |
| ANN | 81.86 | 83.36 | 81.51 |

FIG. 14

Classification accuracy using RGB information (after 200 seconds) and a dynamic strategy.

| Round | Training Accuracy | Test Accuracy | DMMP Accuracy | $N_2$-Water Accuracy |
|---|---|---|---|---|
| 1 | 100.00 | 97.56 | 95.12 | 100.00 |
| 2 | 100.00 | 96.34 | 92.68 | 100.00 |
| 3 | 100.00 | 95.12 | 90.24 | 100.00 |
| 4 | 100.00 | 97.56 | 95.12 | 100.00 |
| 5 | 100.00 | 100.00 | 100.00 | 100.00 |
| Avg. | 100.00 | 97.32 | 94.63 | 100.00 |

FIG. 15

Effect of feature information on classification accuracy.

| Feature Info | Test Accuracy | DMMP Accuracy | $N_2$-Water Accuracy |
|---|---|---|---|
| I + II | 87.15 | 85.42 | 88.24 |
| I + III | 93.56 | 94.83 | 92.73 |
| I + II + III | 95.00 | 95.75 | 94.45 |
| IV | 80.12 | 76.68 | 82.40 |

FIG. 16

Computational performance of optimization solvers in large SVM instance.

| Solver | Classification Time (sec) | Tolerance |
|---|---|---|
| Interior-Point (Ipopt) | Out-of-Memory | - |
| Schur Decomposition (PIPS-NLP) | ≥43,200 | $10^{-5}$ |
| Sequential Minimal Optimization (SMO) | 4,087 | $10^{-1}$ |
| Cluster-Based Preconditioning (IPCluster) | 281 | $10^{-5}$ |

FIG. 17

METHODS, SYSTEMS, AND MEDIA FOR DETECTING THE PRESENCE OF AN ANALYTE

CROSS-REFERENCE TO RELATED APPLICATIONS

This application is based on, claims the benefit of, and claims priority to U.S. Provisional Application No. 62/569,187, filed Oct. 6, 2017, which is hereby incorporated herein by reference in its entirety for all purposes.

STATEMENT REGARDING FEDERALLY SPONSORED RESEARCH

This invention was made with government support under DE-SC0014114 awarded by the US Department of Energy and DMR1435195 awarded by the National Science Foundation. The government has certain rights in the invention.

BACKGROUND

Reliably detecting the presence of many chemicals (e.g., in air, ground water, etc.) at relatively low concentrations often requires expensive lab equipment, and takes considerable amounts of time. For example, the U.S. Department of Energy Savannah River National Lab processes tens of thousands of manually collected groundwater samples at a cost of millions of dollars per year (e.g., on the order of $100 to $1,000 per sample). Each of these samples must be collected and transported to the lab for analysis, which can increase the amount of time between collection and analysis, and can increase the chances of the integrity of the analysis is compromised during collection, transport, storage and/or analysis.

Accordingly, chemical sensing technologies that can be used in-situ and with limited equipment and human intervention are desirable.

SUMMARY

In accordance with some embodiments of the disclosed subject matter, methods, systems, and media for detecting the presence of an analyte are provided.

In accordance with some embodiments of the disclosed subject matter, a method for detecting the presence of an analyte is provided, the method comprising: capturing an image of liquid crystals; determining one or more features based on the brightness of the pixels in the image; providing the one or more features to a trained support vector machine, wherein the support vector machine was trained using images captured of other liquid crystals when exposed to a first analyte and the other liquid crystals exposed to a second analyte; and receiving an indication from the support vector machine indicating whether the liquid crystals have been exposed to the first analyte.

In some embodiments, the method further comprises determining one or more additional features based on the image of the liquid crystals, wherein the one or more additional features comprises outputs of a hidden layer of a trained object detection deep learning convolution neural network that was provided with values of the pixels in the image as an input.

In some embodiments, the one or more additional features are based on a color image of the liquid crystals, and wherein the one or more features are based on a grayscale image of the liquid crystals.

In some embodiments, the method further comprises: converting the RGB image to a grayscale image; calculating a plurality of oriented gradients using the grayscale image; and calculating a histogram of the plurality of oriented gradients, wherein the one or more features comprises values from the histogram of the plurality of oriented gradients.

In some embodiments, the RGB image has a lower resolution than the image of the liquid crystals.

In some embodiments, the first analyte is a gas phase analyte and the second analyte is a non-targeted gas phase molecule.

In some embodiments, the first analyte is DMMP and the second analyte is water vapor.

In some embodiments, the analyte to be detected is sarin.

In some embodiments, the first analyte is a liquid phase analyte and the second analyte is a non-targeted liquid phase analyte.

In some embodiments, the first analyte is a biological analyte.

In some embodiments, the liquid crystals are disposed within a micro-well.

In some embodiments, the liquid crystals are in contact with self-assembling monomers.

In some embodiments, the liquid crystals are in contact with a polymerized target of a bioagent.

In some embodiments, the liquid crystals form at least one droplet suspended in an aqueous phase.

In some embodiments, the liquid crystals are disposed within a holding compartment of a substrate over which an aqueous solution is being passed.

In some embodiments, the liquid crystals are doped with a chiral molecule.

In some embodiments of the disclosed subject matter, a system for detecting the presence of an analyte is provided, the system comprising: an image sensor; and a processor that is programmed to: cause the image sensor to capture an image of liquid crystals; convert the image to grayscale; determine one or more features based on the brightness of the pixels in the grayscale image; provide the one or more features to a trained support vector machine, wherein the support vector machine was trained using images captured of other liquid crystals when exposed to a first analyte and the other liquid crystals exposed to a second analyte; and receive an indication from the support vector machine indicating whether the liquid crystals have been exposed to the first analyte.

In some embodiments of the disclosed subject matter, a non-transitory computer readable medium containing computer executable instructions that, when executed by a processor, cause the processor to perform a method for detecting the presence of an analyte is provided, the method comprising: capturing an image of liquid crystals; converting the image to grayscale; determining one or more features based on the brightness of the pixels in the grayscale image; providing the one or more features to a trained support vector machine, wherein the support vector machine was trained using images captured of other liquid crystals when exposed to a first analyte and the other liquid crystals exposed to a second analyte; and receiving an indication from the support vector machine indicating whether the liquid crystals have been exposed to the first analyte.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 9 to 17 show example results achieved by systems implemented in accordance with some embodiments of the disclosed subject matter.

DETAILED DESCRIPTION

Figure 1:
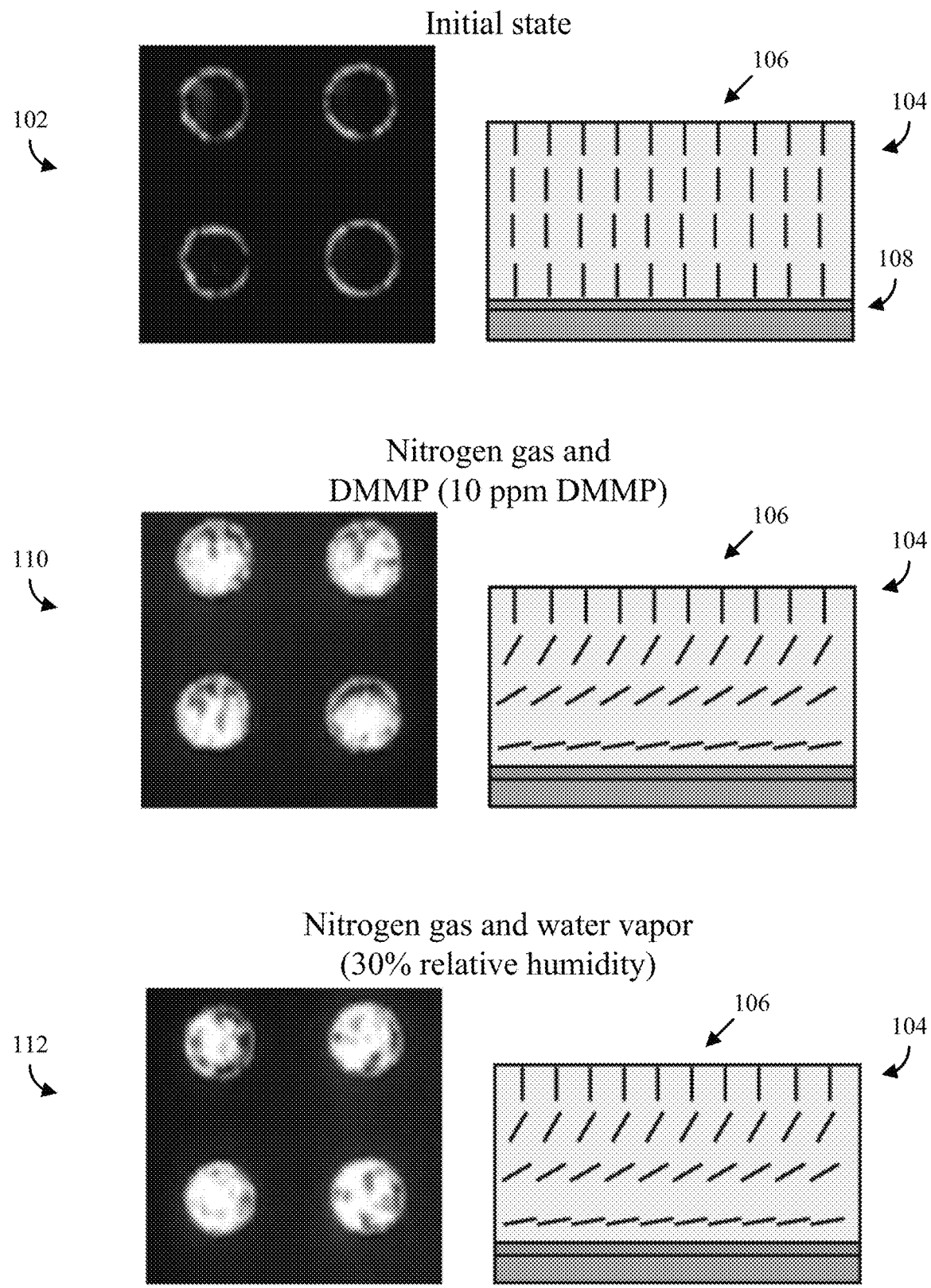
FIG. 1 shows an example of liquid crystal sensors that can be used to detect the presence of an analyte in accordance with some embodiments of the disclosed subject matter.

The present disclosure provides mechanisms which can, for example, include methods, systems, and/or media, for detecting the presence of an analyte.

In some embodiments of the disclosed subject matter, chemically responsive liquid crystals can be used in connection with machine learning techniques to improve selectivity and speed of such liquid crystal sensors. For example, in some embodiments, feature extraction techniques can be used to characterize complex space-time patterns observable in the response of the liquid crystal sensors. In a more particular example, various features, such as average brightness, oriented brightness gradients, and features generated by a deep neural network, can be combined to identify such patterns. In some embodiments, combining multiple sources of feature information can facilitate more accurate classification. Additionally, in some embodiments, different combinations of features can be used as there is generally a tradeoff between the amount of feature information and the number of training samples used to generate a model, and the computational complexity of the resulting classification models.

In some embodiments, machine learning techniques can be used to automatically extract information from liquid crystal responses to improve specificity and speed of liquid crystal sensors. Additionally, in some embodiments, machine learning techniques can facilitate sensing with limited human intervention, which can reduce on-site hardware needs. For example, classification models can be pre-trained (which can be analogous to calibration of more conventional tools) using many experimental samples, and new samples can be classified using the pre-trained model in real-time. In some embodiments, machine learning techniques can facilitate quantification of the impact of liquid crystal design characteristics on the information content of the response signals and on the sensor accuracy, which can reduce the amount of effort required when designing new liquid crystal sensors.

In some embodiments, machine learning technique can generally be characterized as included various computational tasks, such as feature extraction, model training, and model testing. In some embodiments, feature extraction can be used to extract information that can be used by a classification model from raw data. For example, raw data in the context of liquid crystal responses can be one or more images (e.g., time sequences of images) that depict the response of the liquid crystals after a particular sample is introduced. In general, the quality (e.g., informational content) and number of the extracted features can impact the classification accuracy of a classification model. For example, if only non-informative features are used, the classification model is unlikely to be able to distinguish among different liquid crystal responses. In a more particular example, classification is unlikely to be accurate if only aggregate metrics (e.g., average brightness of an image of the liquid crystal sensor) were used as features characterizing an image (e.g., because different images can have the same average brightness value). While experimental researchers often have strong physical insights on which features can best describe a liquid crystal response, they often lack the ability to quantify the quality of such features. Additionally, information can remain hidden to even experienced observers due to pattern complexity and large amounts of data that are generated. Accordingly, measuring the information content of liquid crystal responses can facilitate identification of features that are more predictive that may have otherwise gone unnoticed.

Figure 7A:
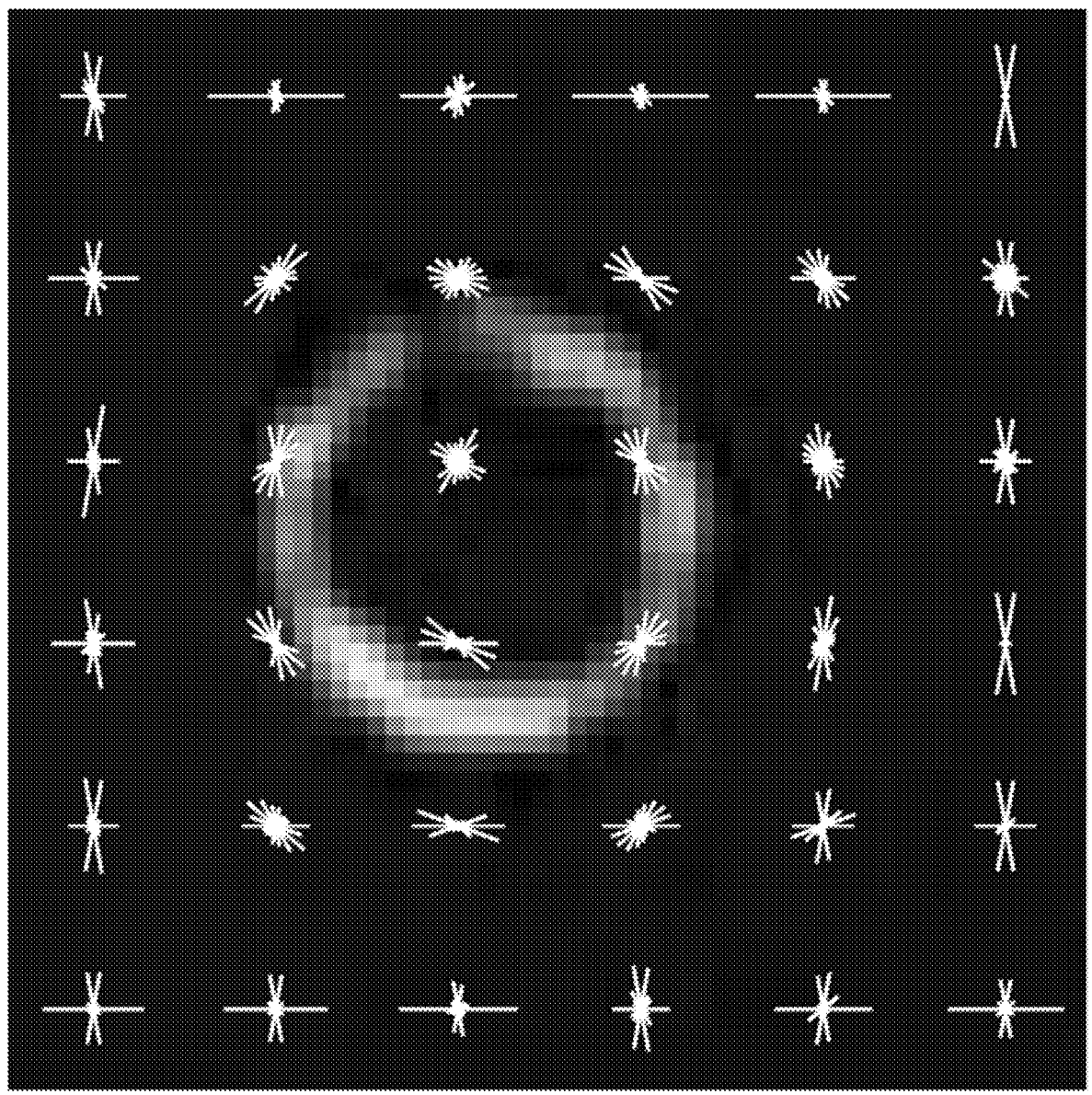
FIG. 7A shows an example of oriented gradients calculated at various points in an image of a micro-well in accordance with some embodiments of the disclosed subject matter.

In some embodiments, computer vision features, such as histogram of oriented gradients (HOG) and features generated by deep neural networks (e.g., Alexnet) can be used to train and/or use a classification model to detect the presence of chemicals (and/or other analytes) using liquid crystal sensors. In some embodiments, HOG features, which are indicative of the gradient orientations in localized portions of an image, can be used to detect persistent spatial patterns (e.g., as shown in FIG. 7A). In some embodiments, features generated by a deep neural network, such as Alexnet which is a classification model (implemented as a convolutional neural network) that has been pre-trained using millions of different images found on the internet, can be used to train and/or use a classification model. For example, neurons of Alexnet, which implicitly seek to classify a new image based on previous knowledge of other images (even if these are not necessarily related to the application at hand), can be used as image features for another type of classification model (e.g., a support vector machine, as described below).

Note that although the mechanisms described herein are generally described in connection with support vector machines, this is merely an example, and the techniques can be used in connection with other types of classification models, such as logistic regression models, and deep neural networks.

FIG. 1 shows an example of liquid crystal sensors that can be used to detect the presence of an analyte in accordance with some embodiments of the disclosed subject matter. As shown in FIG. 1, an image 102 of a group of micro-wells into which liquid crystals have been deposited. The liquid crystal is in an initial state in the absence of a chemical that cause an ordering transition of the liquid crystal. As shown in a representation 104 of a micro-well into which liquid crystals 106 have been deposited, the orientation of liquid crystals 106 are generally perpendicular to the bottom surface of the micro-well, which causes the micro-well to appear dark when image 102 was captured between crossed polarizers, as liquid crystals 106 do not change the polarization of transmitted light in the orientation shown in 104. In some embodiments, a material, such as aluminum perchlorate can be deposited at the bottom of micro-well 104 to encourage the perpendicular orientation shown in 104 in the absence of an interfering chemical (e.g., as described below.) In some embodiments, micro-wells shown in image 102 can be created using any suitable technique or combination of techniques, and any suitable type(s) of liquid crystal. Additionally, any suitable coating can be used to encourage a particular orientation of liquid crystals in the absence of the chemical to be detected. For example, polymeric micro-wells, such as micro-well 104, can be formed in a polymeric material deposited on a glass surface using photolithography, and 50 microliters (μL) of 10 millimolar (mM, i.e., $10^{-3}$ mol/L) aluminum perchlorate salts in ethanolic solution can be deposited within the micro-wells by spin-coating (e.g., at about 3,000 rpm for 30 seconds) onto glass surfaces at the bottom of the polymeric micro-wells. In such an example, 2 μL of 5CB (i.e., 4-Cyano-4'-pentylbiphenyl) can be deposited into the formed polymeric micro-wells with a depth of about 5 microns (μm) using a micropipette, and excess liquid crystal can be removed from the array by wicking into a microcapillary.

When particular chemicals are introduced into a micro-well (e.g., micro-well 104) that includes liquid crystal, the liquid crystal can undergo surface-driven ordering transition such that the liquid crystals that were arranged in the configuration perpendicular to the bottom surface of the micro-well transition to a configuration where the crystals are parallel to the bottom surface of the micro-well. For example, in response to the presence of chemical species such as organophosphonates, chlorine, ammonia, or hydrogen sulfide ($H_2S$) the liquid crystal can make such an ordering transition. In some embodiments, the optical and/or other characteristics (features) of the liquid crystal transitions can be tailored and exploited to design chemical sensors that can be used to detect particular types of chemicals. For example, the liquid crystals can assume homeotropic (perpendicular) orientations on surfaces decorated with different kinds of metal salts (e.g., as described above in connection with micro-well 104) dependent on the strength of coordination interactions between functional groups (e.g., nitrile groups, pyridine groups, etc.) and the metal cations. In a more particular example, in some embodiments, specific chemical species that diffuse into the liquid crystals and bind more strongly to the metal cations than to the liquid crystal functional groups can trigger a transition of the liquid crystal orientation from homeotropic to planar (e.g., as shown in FIG. 1). In some embodiments, the selectivity and response characteristics (e.g., dynamics) of the liquid crystals can be adjusted by tuning the binding energies of the liquid crystal functional groups. For example, the chemical can bind to the metal cations, displacing the previously bound liquid crystals, which can trigger orientation transitions of the liquid crystals. In a more particular example, such orientation transitions can be caused using liquid crystals fabricated using 4-cyano-4'-penthylbiphenil (5CB) and surfaces presenting aluminum perchlorate salts.

As shown in FIG. 1, when such an anchoring transition occurs the micro-wells transmit significantly more light, which can be observed as a visual indicator of the presence of the chemical. Image 110 shows the micro-wells of image 102 after dimethyl-methyl-phosphonate (DMMP) nitrogen vapor (with a concentration of 10 parts per million DMMP) has been introduced, while image 112 shows the micro-wells of image 102 after nitrogen-water vapor with a relative humidity of about 30% has been introduced. As demonstrated by images 110 and 112, commonly occurring chemicals (e.g., water) can cause an anchoring transition that results in a similar micro-well appearance to what is caused when the chemical of interest is present (e.g., DMMP in the example of FIG. 1). As shown in FIG. 1, the appearance of the micro-well cannot be easily distinguished among different substances, and a human observer or a simple machine vision application (e.g., that simply detects changes in brightness) cannot confidently determine whether it is DMMP that has caused the anchoring transition or water vapor, and this is problematic for other liquid crystals as well. The example shown in FIG. 1 with DMMP and water vapors is a particular illustration of the implications of such potential confusion, as DMMP is an organophosphate that is often used as a sarin gas-simulant for the calibration of chemical sensors, and because water (which is prevalent in many environments in which such sensors may be used) can interfere with sensing activity. One approach to overcoming an inability to distinguish similar liquid crystal responses would be through selection of particular surface chemistry, liquid crystal chemistry, and/or other parameters. However, this process would necessarily involve extensive and laborious experimentation to determine which chemistries, etc., cause the liquid crystal responses to be sufficiently distinct (especially without the ability to quantify how such changes impact the difference in appearance). Additionally, even if such a sensor were constructed, the initial state of the liquid crystal and of the surface generally exhibits variations from sample to sample, which can induce variations in the liquid crystal response (e.g., which can introduce sensor noise).

Figure 2:
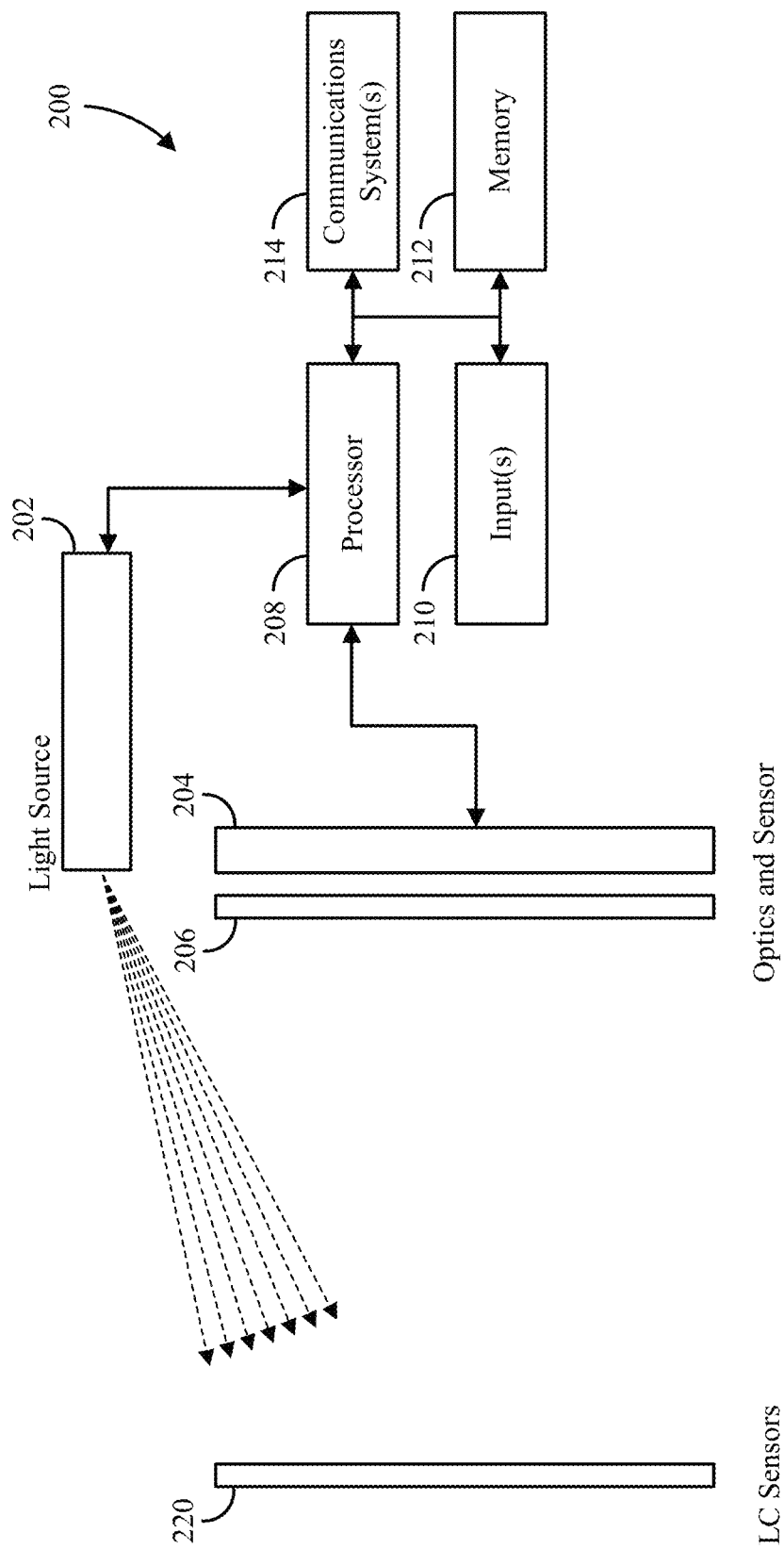
FIG. 2 shows an example of a system for detecting the presence of an analyte in accordance with some embodiments of the disclosed subject matter.

FIG. 2 shows an example 200 of a system for detecting the presence of an analyte in accordance with some embodiments of the disclosed subject matter. As shown, system 200 can include a light source 202; an image sensor 204; optics 206; a processor 208 for controlling operations of system 200 which can include any suitable hardware processor (which can be a microprocessor, digital signal processor, a microcontroller, a GPU, etc.) or combination of hardware processors; an input device 210 (such as a shutter button, a menu button, a microphone, a touchscreen, a motion sensor, a etc., or any suitable combination thereof) for accepting input from a user and/or from the environment; memory 212; and a communication system or systems 214 for allowing communication between processor 208 and other devices, such as a smartphone, a wearable computer, a tablet computer, a laptop computer, a personal computer, a server, etc., via a communication link. In some embodiments, memory 212 can store images of one or more liquid crystal sensors 220 (e.g., one or more micro-wells as described above in connection with FIG. 1), one or more normalized images, one or more features generated from the images, etc. Memory 212 can include a storage device (e.g., a hard disk, a Blu-ray disc, a Digital Video Disk, RAM, ROM, EEPROM, etc.) for storing a computer program for controlling processor 208. In some embodiments, memory 212 can include instructions for causing processor 208 to execute processes associated with the mechanisms described herein, such as processes described below in connection with FIGS. 4 and 5. In some embodiments, light source 202 can be any suitable light source that produces light that is reflected or transmitted by planar liquid crystals. Accordingly, although light source 202 is shown as being disposed on the same side of liquid crystal sensors 220 as image sensor 204, this is merely an example, and light source 202 can be disposed on a different side of liquid crystal sensors 220 (e.g., on the opposite side of liquid crystal sensors 220 such that light emitted by light source 202 must be transmitted through liquid crystal sensors 220 before being received at image sensor 204). For example, light source 202 can be one or more LEDs, a white light source (e.g., a halogen bulb), etc. Note that, in some embodiments, light source 202 can be omitted where liquid crystal sensors 202 are illuminated by another light source (e.g., one or more ambient light sources). In some embodiments, the light source is polarized, and in other embodiments the transmitted or reflected light is passed through a second polarizer.

In some embodiments, image sensor 204 can be any suitable image sensor that can generate an image of liquid crystal sensors 220 with sufficient resolution and focus to facilitate classification using machine learning techniques. In some embodiments, image sensor 204 can be a color sensor, a monochrome sensor, etc. Additionally, in some embodiments, image sensor 204 can be any suitable type of image sensor, such as a CCD, a CMOS image sensor, etc. Additionally, in some embodiments, image sensor 204 can implemented as an array sensor (e.g., a two-dimensional distribution of pixels), a line sensor (e.g., having a one-dimensional distribution of pixels), a single pixel sensor, and/or using any other arrangement of light sensitive elements suitable to generate an image of one or more of liquid crystal sensors 220. In some embodiments, an image can be captured by scanning the liquid crystal sensor with image sensor 204 (e.g., by moving image sensor 204 and/or liquid crystal sensors 220). For example, an array sensor can be scanned in one or more direction relative to liquid crystal sensors 220 to capture images of different portions of liquid crystal sensors 220. As another example, a line sensor can be scanned in one or more direction relative to liquid crystal sensors 220 to capture images of different portions of liquid crystal sensors 220. In a more particular example, a line sensor can capture an image of a linear portion of liquid crystal sensors 220 as liquid crystal sensors moves through a field of view of the line sensor (e.g., by moving the line sensor and/or by moving liquid crystal sensors 220). As yet another example, a single pixel sensor can be raster scanned in relation to the liquid crystal sensor to generate a two dimensional image of the liquid crystal sensor. In some embodiments, image sensor 204 can capture image data in the visible portion of the electromagnetic spectrum and/or in other portions of the electromagnetic spectrum (e.g., near-infrared, infrared, ultraviolet, etc.). Although the mechanisms described herein are generally described in connection with visible light images (e.g., color, grayscale, monochrome, etc.), this is merely an example, and images of liquid crystal sensors representing one or more other portions of the electromagnetic spectrum can be used to detect the presence of an analyte.

In some embodiments, optics 206 can be any combination of optics that facilitates image capture of liquid crystal sensors 220 by image sensor 204, such as one or more lenses, one or more filters (e.g., IR cut filters, a high pass filter, a low pass filter, a bandpass filter, a polarizing filter, etc.).

In some embodiments, system 200 can communicate with a remote device over a network using communication system(s) 214 and a communication link. Additionally or alternatively, system 200 can be included as part of another device, such as a smartphone, a tablet computer, a laptop computer, etc. Parts of system 200 can be shared with a device within which system 200 is integrated. For example, if system 200 is integrated with a smartphone, processor 208 can be a processor of the smartphone and can be used to control operation of system 200.

In some embodiments, system 200 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, another device can be configured to receive image data captured by system 200, and can use the image data to determine whether a particular chemical is present at liquid crystal sensors 220 based on the image data.

Communications by communication system 214 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 200 and another device, such as a network link, a dial-up link, a wireless link, a hard-wired link, any other suitable communication link, or any suitable combination of such links. System 200 and/or another device (e.g., a server, a personal computer, a smartphone, etc.) can enable more reliable detection of particular chemicals at liquid crystal sensors 220.

It should also be noted that data received through the communication link or any other communication link(s) can be received from any suitable source. In some embodiments, processor 208 can send and receive data through the communication link or any other communication link(s) using, for example, a transmitter, receiver, transmitter/receiver, transceiver, or any other suitable communication device.

In a particular example, the optical appearance of liquid crystal sensors can be characterized using an Olympus BX-60 polarizing light microscope in transmission mode (available from Olympus Corporation, headquartered in Tokyo, Japan). Images of the liquid crystal sensors can be captured using conoscopic imaging techniques, including inserting a Bertrand lens into the optical path of the polarized-light microscope. As described below in connection with FIGS. 4 and 5, image data captured using such an imaging device can be used to analyze the homeotropic orientation of the liquid crystals.

Figure 3:
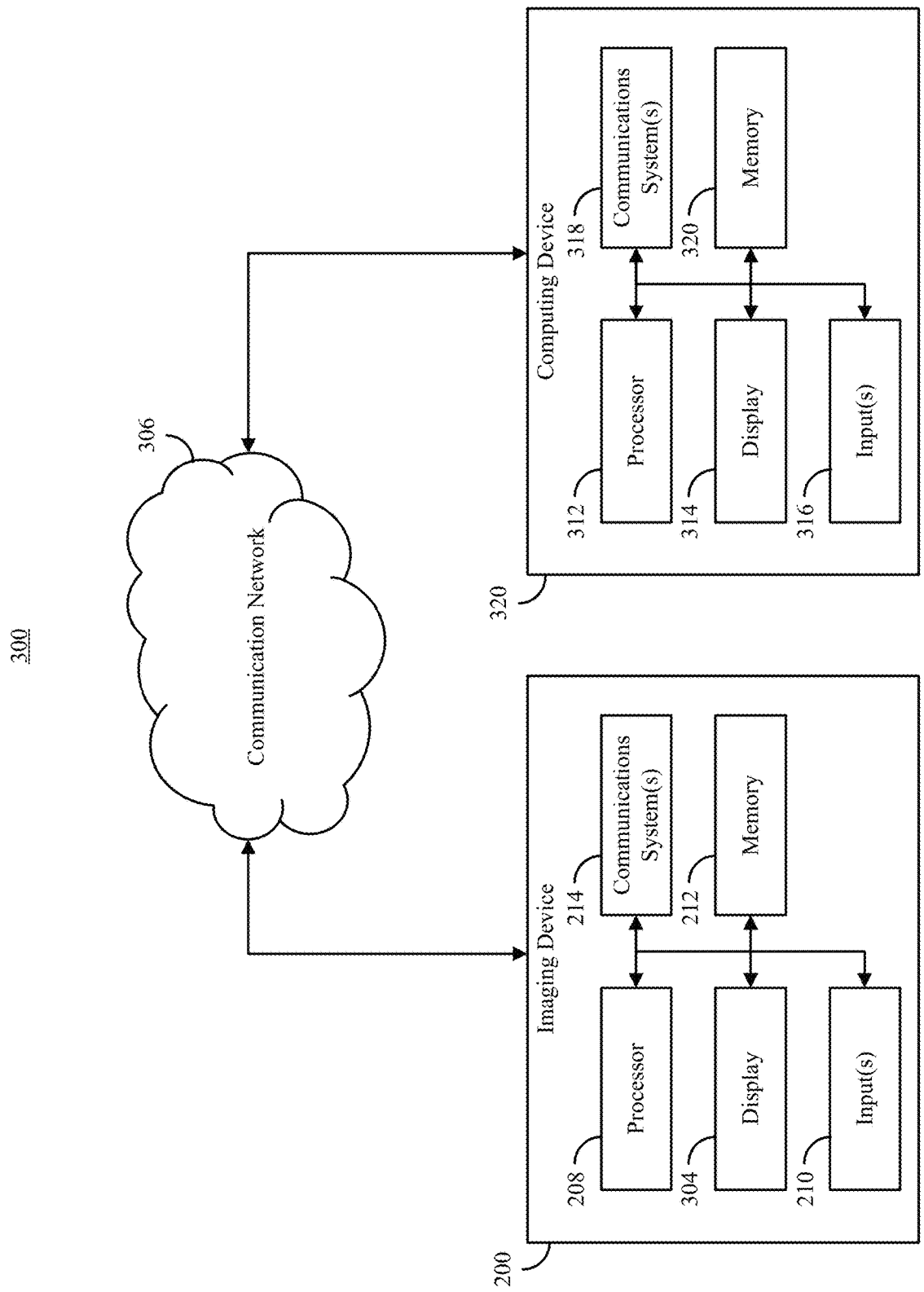
FIG. 3 shows an example of hardware that can be used to implement the system depicted in FIG. 2 and a computing device in accordance with some embodiments of the disclosed subject matter.

FIG. 3 shows an example 300 of hardware that can be used to implement system 200 and a computing device 320 in accordance with some embodiments of the disclosed subject matter. As shown in FIG. 3, in some embodiments, system 200 can include processor 208, a display 304, one or more inputs 210, one or more communication systems 214, and/or memory 214. In some embodiments, display 304 can include any suitable display devices, such as a computer monitor, a touchscreen, a television, etc. In some embodiments, communication system(s) 214 can communicate with computing device 320 (and/or any other suitable computing device(s)) over a communication network 306. In some embodiments, communication network 306 can be any suitable communication network or combination of communication networks. For example, communication network 306 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 306 can be a local area network, a wide area network, a public network (e.g., the Internet), a private or semi-private network (e.g., a corporate or university intranet), any other suitable type of network, or any suitable combination of networks. Communications links shown in FIG. 3 can each be any suitable communications link or combination of communications links, such as wired links, fiber optic links, Wi-Fi links, Bluetooth links, cellular links, etc.

In some embodiments, computing device 320 can include a processor 312, a display 314, one or more inputs 316, one or more communications systems 318, and/or memory 320. In some embodiments, processor 312 can be any suitable hardware processor or combination of processors, such as a central processing unit, a graphics processing unit, etc. In some embodiments, display 314 can include any suitable display devices, such as a computer monitor, a touchscreen, a television, etc. In some embodiments, inputs 316 can include any suitable input devices and/or sensors that can be used to receive user input, such as a keyboard, a mouse, a touchscreen, a microphone, etc.

In some embodiments, communications systems 318 can include any suitable hardware, firmware, and/or software for communicating information over communication network 306 and/or any other suitable communication networks. For example, communications systems 318 can include one or more transceivers, one or more communication chips and/or chip sets, etc. In a more particular example, communications systems 318 can include hardware, firmware and/or software that can be used to establish a Wi-Fi connection, a Bluetooth connection, a cellular connection, an Ethernet connection, etc.

In some embodiments, memory 320 can include any suitable storage device or devices that can be used to store instructions, values, etc., that can be used, for example, by processor 312 to present content using display 314, to communicate with one or more computing devices (e.g., system 800), etc. Memory 320 can include any suitable volatile memory, non-volatile memory, storage, or any suitable combination thereof. For example, memory 320 can include RAM, ROM, EEPROM, one or more flash drives, one or more hard disks, one or more solid state drives, one or more optical drives, etc. In some embodiments, memory 320 can have encoded thereon a program for controlling operation of computing device 320. In such embodiments, processor 312 can execute at least a portion of the program to receive information (e.g., image data) from one or more imaging devices (e.g., system 200), train a classification model to classify images of a liquid crystal sensor as showing the presence of a particular chemical, determine from an image of a liquid crystal sensor whether a particular chemical is present, receive instructions from one or more devices (e.g., a personal computer, a laptop computer, a tablet computer, a smartphone, etc.), etc. In some embodiments, computing device 320 can be any type of computing device, such as a personal computer, a laptop computer, a tablet computer, a smartphone, a server, etc.

Figure 4:
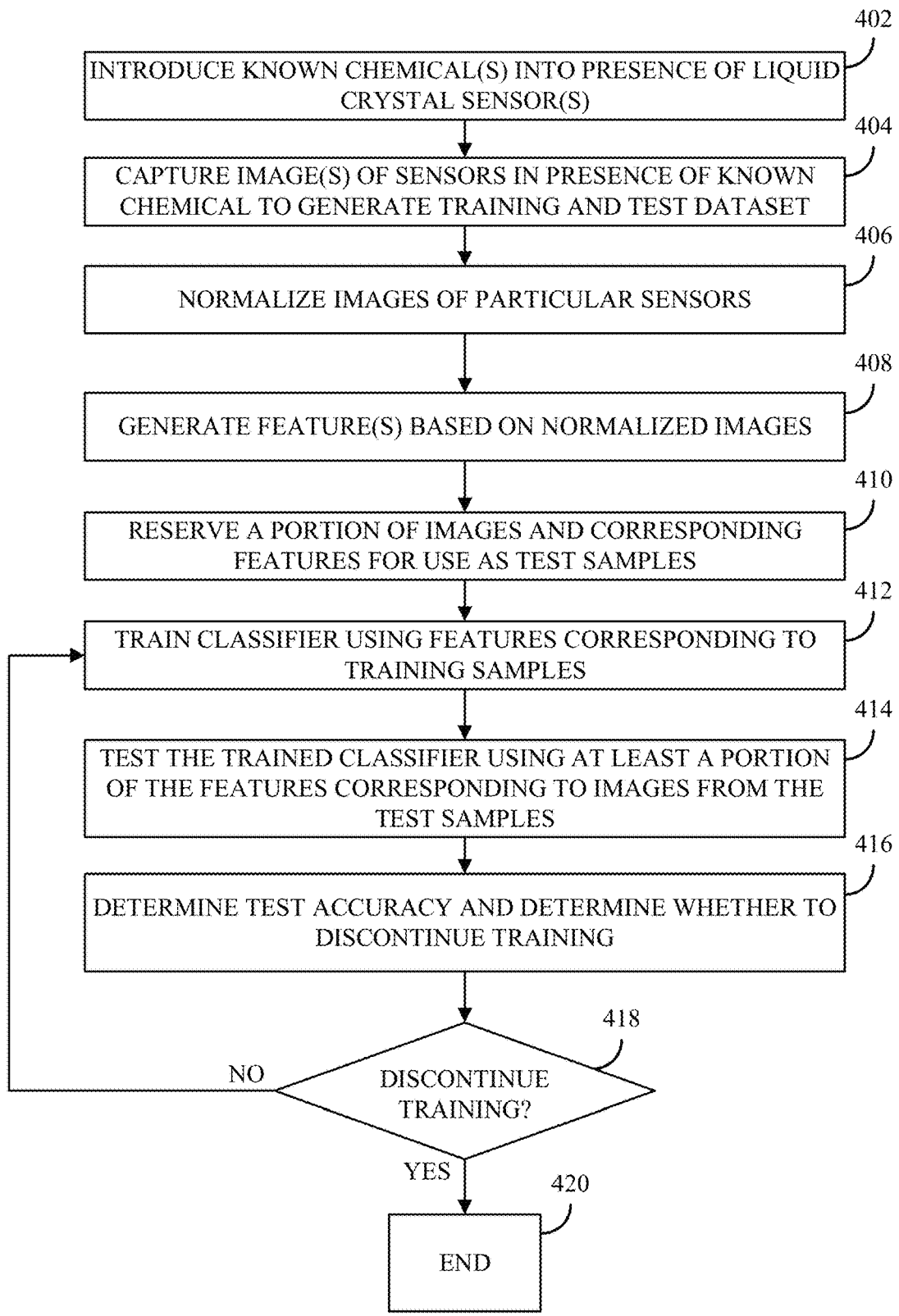
FIG. 4 shows an example of a process for training a classification model to classify images of liquid crystal sensors to determine whether the image indicates the presence of a particular chemical in accordance with some embodiments of the disclosed subject matter.

FIG. 4 shows an example 400 of a process for training a classification model to classify images of liquid crystal sensors to determine whether the image indicates the presence of a particular chemical in accordance with some embodiments of the disclosed subject matter. As shown in FIG. 4, process 400 can start at 402 by introducing a known chemical (e.g., in a known quantity and/or concentration) into the presence of one or more liquid crystal sensors (e.g., liquid crystal sensors 220).

At 404, process 400 can capture one or more images of the liquid crystal sensors in the presence of the known chemical to generate images that can be used as training samples and test samples to train a classification model to recognize the presence of the known chemical. In some embodiments, the images can be captured using any suitable image capture device, at any suitable regular or irregular intervals (or only a single image can be captured), and can be captured using any technique or combination of techniques. For example, in some embodiments, process 400 can capture video of the liquid crystal sensors, and can extract individual still images from the video at any suitable regular or irregular intervals. Note that an image can be any representation of a spatial distribution of optical information corresponding to light received by an image sensor that has passed through and/or been reflected from the liquid crystal sensor(s).

At 406, process 400 can generate normalized images of particular sensors using any suitable technique or combination of techniques. For example, in some embodiments, images of individual sensors can be extracted from the images, and each image of a sensor can be processed such that the images have a common format (e.g., as described below in connection with FIG. 6).

At 408, process 400 can generate one or more features to be used to train the classification model. In some embodiments, process 400 can generate any suitable feature or combination of features, which may vary based on what type of classification model is being trained. In some embodiments, any suitable features can be generated from the image data to be used to train the classification model (and, as described below in connection with FIG. 5, to use the trained classification model to detect the presence of an analyte). For example, the mean intensity of the image can be calculated and used as a feature. As another example, multiple oriented gradients can be calculated at different points in the image, and a histogram of the oriented gradients (HOG) can be used as a feature. Such HOG features can be calculated using any suitable technique or combination of techniques. In a more particular example, the Matlab function extractHOGfeatures can be used with a cell size [10, 10] to extract HOG features. With a 60×60 grayscale image (as described below in connection with FIG. 6), this can result in 900 individual features per image.

Figure 8:
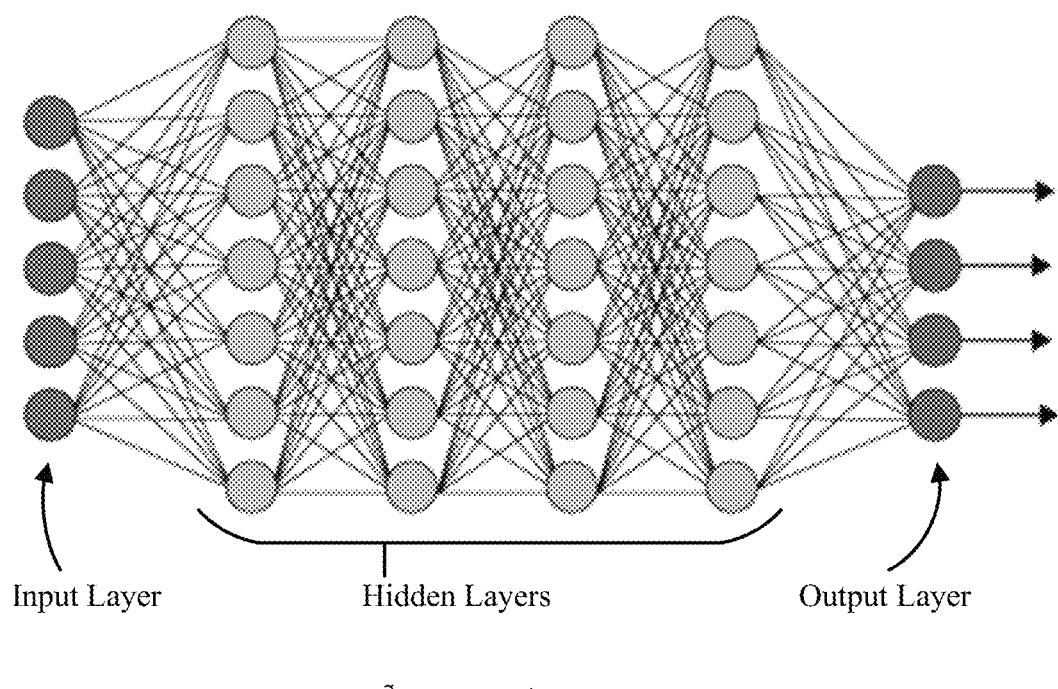
FIG. 8 shows an example network topology of a convolution neural network that can be used to generate features for use in accordance with some embodiments of the disclosed subject matter.

As yet another example, output from one or more layers of a deep learning neural network can be used as features for training a classification model. In a more particular example, an RGB image of the micro-well can be used as input to a well-trained object classification convolution neural network, and the values generated by the last hidden layer can be used as features for training the classification model. In one particular example, the image can be submitted to alexnet, which was trained for object detection/classification in images using a portion of the ImageNet database. An example showing the general topology of alexnet is shown in FIG. 8. As a particular example, this can generate 4096 features from a 60×60 RGB image.

As still another example, the image can be converted from RGB to a 60×60 grayscale image, and the pixel values (i.e., brightness values) of the grayscale image can be used as features, which can generate 3,600 features. Note that the RGB values can be used as features, but this triples the number of features to 10,800, which may lead overfitting of the model.

At 410, process 400 can reserve a portion of the images as testing samples using any suitable technique or combination of techniques. For example, if the images captured at 404 each include multiple micro-wells, and successive images depict the same micro-wells at different times as the chemical was introduced, the micro-wells can be partitioned with a portion of the micro-wells assigned as test samples, and a portion of the micro-wells assigned as training samples. As another example, the entire corpus of images of micro-wells can be randomly partitioned, which may result in images of the same micro-well at different times being in both the training set and the test set.

At 412, process 400 can train the classifier using the features corresponding to the training samples, and the known classification of the images. In some embodiments, images of the micro-wells during exposure to different chemicals can be used during the training (e.g., images of the micro-wells exposed to DMMP, and images of the micro-wells exposed to water vapor). In some embodiments, process 400 can train any suitable type of classification model, such as a logistic regression model, a support vector machine-based model, or a neural network.

Distinguishing among liquid crystal responses to two different substances (e.g., I or II) can be characterized as a binary classification problem. One approach is to find a model or hypothesis $f:\mathbb{R}^n \to \mathbb{R}$ that maps an input vector $x_i \in \mathbb{R}^n$ to predict output variables $y_i \in \{0, 1\}$. The input vector $x_i$ is also sometimes referred to as a feature vector (where features characterize the liquid crystal response) while $y_i$ are sometimes referred to as labels (e.g., indicating the presence of substance I or II). For example, label $y_i = 1$ can represent the presence of DMMP (e.g., in $N_2$ vapor solution) and $y_i = 0$ can represent the presence of water (e.g., in $N_2$ vapor solution). A pair $(x_i, y_i)$ can represent a sample for $i=1, \ldots, m$. In some embodiments, a database of m samples $\{(x_1, y_1), \ldots, (x_m, y_m)\}$ that can be used as a training set to learn a classifier model.

In some embodiments, a logistic regression model can be trained that uses a hypothesis function of the following form:

$$f(x_i) = 1_{[0,+\infty)}(w^T x_i + b), \quad (1)$$

where $1_A(Z)$ can denote the indicator function of set A (i.e., $1_A(Z) = 1$ if $Z \in A$ and $1_A(Z) = 0$ if $Z \notin A$). The model parameters to be learned from the training set are the weight vector for the features $w \in \mathbb{R}^n$ and $b \in \mathbb{R}$. The learning process can include solving the following optimization problem:

$$\min_{w,b} -\frac{1}{m}\sum_{i=1}^{m}\left[y_i \log\left(\frac{1}{1+e^{w^T x_i - b}}\right) + (1 - y_i)\log\left(1 - \frac{1}{1+e^{w^T x_i - b}}\right)\right] + \frac{\lambda}{2m}\|w\|^2, \quad (2)$$

The first term of the objective function can measure the accuracy of the hypothesis on the training set and the second term is a regularization term that can prevent over-fitting. The hyperparameter $\lambda \in \mathbb{R}_+$ is a regularization parameter that can determine the balance between how well the hypothesis fits the training set, and how well the hypothesis generalizes to other data. A large value of $\lambda$ may cause under-fitting of the model, whereas a small value of $\lambda$ may cause overfitting. This hyperparameter can be determined by a model selection process described below. The hypothesis function of a logistic regression model is convex, so any optimal parameter selection provides a global minimizer. However, the parameter values may be non-unique.

In some embodiments, a support vector machine (SVM)-based model can be trained that uses the same hypothesis function as logistic regression. However, SVM models solve the following optimization problem to learn w and b:

$$\min_{w,b} C \sum_{i=1}^{m} [y_i \max(0, 1 - w^T x_i - b) + (1 - y_i)\max(0, -1 + w^T x_i - b)] + \frac{1}{2}\|w\|^2, \quad (3)$$

where $C \in \mathbb{R}_+$ is a hyperparameter that can be used to prevent over- or under-fitting (e.g., as described above in connection with $\lambda$ in the logistic regression model). In some embodiments, SVM can introduce nonlinear relations that map the original feature vector $x_i \in \mathbb{R}^n$ to a new vector of features $[K(x_i, x_1), \ldots, K(x_i, x_m)] \in \mathbb{R}^m$, where $K(\cdot)$ is a kernel function, which can amplify the effect of the features on the outputs. In some embodiments, the kernel function can be a Gaussian kernel such that $K(x_j, x_i) = \exp(-\gamma \|x_j - x_i\|^2)$, which can be viewed as the similarity between features $x_j$ and $x_i$. In some embodiments, the resulting new transformed features can be input to a linear SVM to generate a hypothesis model. For nonlinear SVM, the value of both C and the kernel function parameters (e.g., $\gamma$) can be selected in the model selection process described below.

In general, an SVM can be trained to find a multi-dimensional hyperplane that effectively separates the training samples (which are described in terms of their features) into two or more classes. For simplicity, only techniques for generating hyperplanes for two classes (binary classification) are described herein. The hyperplane can be described by a weighted function of the features. In some embodiments, an SVM can be trained by solving an optimization problem to find the feature weights that achieve a maximum separation among the training samples. Such a classification problem can be represented using the following mathematical form:

$$\min_{\omega,\gamma,\xi_S} \frac{1}{|S|} \Sigma_{s \in S} \xi + \lambda w^T w \quad (4)$$

$$\text{s.t. } \gamma_S \cdot (w^T \varphi(x_S) - \gamma) \geq 1 - \xi_S, s \in S \quad (5)$$

$$\xi_S \geq 0 \; s \in S \quad (6)$$

where, $s \in S$ is the index of the sample in the training set S (e.g., containing S samples), $x_s$ is the vector of features of sample s with associated classification label $y_s$ (e.g., $y_s=1$ if a sample contains $N_2$-DMMP and $y_s=-1$ if a sample contains $N_2$-Water), $\xi_s$ is the classification error, w is the weight vector, $\gamma$ is the hyperplane offset, $\lambda$ is a regularization parameter that prevents overfitting (e.g., when many features are used), and $\varphi(\bullet)$ is the feature mapping function (e.g., $\varphi(x_s) = x_s$ for linear classification). A solution of the SVM problem can be used to specify model parameters $w^*$, $\gamma^*$ that can define a trained classification model.

In general, the computational complexity of the SVM problem described by EQS. (4) to (6) is high, and related to both the number of training samples and the number of features used (e.g., the dimension of vector $x_s$, which can be thousands using features described herein). Various techniques can be used to tackle such computational complexity. For example, a scalable and flexible approach includes using interior-point algorithms. These algorithms can achieve relatively high accuracies, and can exploit underlying mathematical structure at the linear algebra level. In such an example, effective structure exploitation strategies can be used to leverage high-performance (parallel) computing capabilities. In a more particular example, different solvers, such as IPCluster and PIPS-NLP, can be used to solve large-scale structured optimization problems that have the same mathematical structure of SVM problems. In particular, such solvers can exploit the following arrowhead structure of the linear algebra system that can be represented as:

$$\begin{bmatrix} K_1 & & & & B_1 \\ & K_2 & & & B_2 \\ & & \ddots & & \vdots \\ & & & K_S & B_S \\ B_1^T & B_2^T & \cdots & B_S^T & K_0 \end{bmatrix} \begin{bmatrix} q_1 \\ q_2 \\ \vdots \\ q_S \\ q_0 \end{bmatrix} = \begin{bmatrix} r_1 \\ r_2 \\ \vdots \\ r_S \\ r_0 \end{bmatrix} \quad (7)$$

As used herein, $q_0$ can be a search step associated to the feature weights and offset and $q_s$ can be the search step for the dual variables of the classification constraints and for the classification errors in sample $s \in S$. The diagonal blocks $K_S$ can be sparse matrices that are associated to each training sample (e.g., in stochastic programming these can be random scenarios). This arrowhead system can be solved in parallel computers using a Schur complement decomposition that can be represented as:

$$\underbrace{\left(K_0 - \sum_{s \in S} B_s^T K_s^{-1} B_s\right)}_{Z} q_0 = r_0 - \sum_{s \in S} B_s^T K_s^{-1} r_s, \; K_s q_s = r_s - B_s q_0, s \in S \quad (8)$$

In some embodiments, using this technique can parallelize operations associated with each individual block $K_s$, but scalability can be limited by operations with the Schur complement matrix Z (which is generally a dense matrix of the same dimension as the number of features). This can limit the use of SVM to classification problems with few thousands of features or less. The use of dense linear algebra operations can also be an obstacle that prevents scalability of dual algorithms that operate on the sample (kernel) space. In some embodiments, scalability bottlenecks of Schur decomposition can be overcome by IPCluster using adaptive clustering techniques, which can identify data redundancies in the training samples and exploit these redundancies to compress the number of samples into a smaller set of clusters $C = \{c_1, \ldots, c_c\}$. In some embodiments, the compressed set of samples can then used to create a sparse preconditioner that can be used in connection with EQ. (8), and which can be represented as:

$$\begin{bmatrix} \frac{1}{S_1} K_{C_1} & & & & B_{C_1} \\ & \frac{1}{S_2} K_{C_2} & & & B_{C_2} \\ & & \ddots & & \vdots \\ & & & \frac{1}{S_C} K_{c_C} & B_{c_C} \\ B_{c_1}^T & B_{c_2}^T & \cdots & B_{c_C}^T & K_0 \end{bmatrix} \begin{bmatrix} q_{c_1} \\ q_{c_2} \\ \vdots \\ q_{c_C} \\ q_0 \end{bmatrix} = \begin{bmatrix} r_{c_1} \\ r_{c_2} \\ \vdots \\ r_{c_C} \\ r_0 \end{bmatrix} \quad (9)$$

where $K_s q_s = r_s - B_s \bar{r}_0$, with $s \in S$. Numerical experiments have shown that the size of the compressed sample set is typically less than about 10% of the size of the original sample space. In some embodiments, by utilizing such clustering techniques the amount of dense linear algebra operations to be performed can be reduced (or eliminated), which can avoid scalability issues in the number of features. Additionally, in some embodiments, such clustering techniques can be executed in parallel, which can facilitate linear scaling in the number of training samples. The clustering techniques described herein share some characteristics of hierarchical multi-grid preconditioners used in the solution of partial differential equations, and can be generalized to perform hierarchical clustering. Note that, as described herein, sample compression can be performed at the linear algebra level, but the original SVM problem (containing all the training samples) is actually solved. In some embodiments, the clusters can be constructed by minimizing the distortion metric $\Sigma_{s \in S} \Sigma_{i \in C} k_{s,i} \|\bar{\gamma}_i - \gamma_s\|$, where $\gamma_s$ are the features of samples. Note that the quality of the preconditioner (e.g., the preconditioner's spectral properties) is generally tightly related to the distortion metric, which implies that strong data redundancies can yield efficient preconditioners.

In some embodiments, an artificial neural network (ANN) (e.g., a convolution neural network as represented in FIG. 8) that includes an input layer, one or more hidden layers, and an output layer can be trained to classify images. In such a neural network, each layer includes several basic unit functions, which are sometimes referred to as neurons. In some embodiments, the input layer can be features $x_i$, and the output layer has one neuron representing the predicted probability of $y_i=1$. The total number of layers can be denoted as L, and the number of neurons in a particular layer $\ell$ can be represented as $s_\ell$, and the value of j-th neuron of the at $\ell$-th layer as $a_{\ell,j}$, which can be represented as part of a vector $a_\ell := [a_{\ell,1}, \ldots, a_{\ell,s_\ell}]$. The information of layer $\ell -1$ can be provided to a j-th neuron in layer $\ell$ using the mapping $a_{\ell,j} = g_\ell(w_\ell^T a_{\ell-1} + b_{\ell,j})$, where $g_\ell$ can be an activation function of layer $\ell$. In some embodiments, the activation function can be the logistic function (e.g., as used in logistic regression). In some embodiments, parameters $\mathbf{w}_\ell$, $\mathbf{b}_\ell$ and $\mathbf{a}_\ell$ can be represented as $\mathbf{w}_\ell := [w_{\ell,1}, \ldots, w_{\ell,s_\ell}]$, $\mathbf{b}_\ell := [b_{\ell,1}, \ldots, b_{\ell,s_\ell}]$, and $\mathbf{a}_\ell = g_\ell(\mathbf{w}_\ell^T \mathbf{a}_{\ell-1} + \mathbf{b}_\ell)$, respectively. During the training process, parameters $\mathbf{w}_\ell$ and $\mathbf{b}_\ell$ can be learned for all $\ell = 1, \ldots, L$. Assuming that the last layer (i.e., $\ell = L$) uses the logistic function as the activation function, the training process can solves the following optimization problem:

$$\min_{w_\ell, b_\ell} -\frac{1}{m} \sum_{i=1}^{m} [y_i \log(a_{L,i}) + (1 - y_i) \log(1 - a_{L,i})] + \frac{\lambda}{2m} \sum_{l=2}^{L} \|w\|^2 \quad (10)$$

where $\lambda \in \mathbb{R}_+$ can be a regularization parameter (e.g., as described above in connection with EQ. (2). After parameters $\mathbf{w}_\ell$ and $\mathbf{b}_\ell$ are learned, $y_i$ (i.e., the likelihood that an input belongs to class i) given any new input $x_i$ using forward propagation as follows:

$$a^1 = g^1(w_1^T x_i + b^1), \ldots, a^1 = g^1(w_1^T x_i + b^1), \text{ and}$$
$$\hat{y}_i = 1_{[0.5,1)}(a^L).$$

In some embodiments, given a particular type of classification model to be trained, a portion of the images captured at 404 can be randomly assigned into a training set, and a second portion can be assigned to a test set (e.g., 80% of the samples can be selected for training, and the remaining 20% can be used for testing). The training set can be used to determine parameters for the hypothesis model, while the test set (sometimes referred to as a hold-out set) can be used to assess how well the learned hypothesis model generalizes to unknown samples (e.g., samples that were not explicitly used for training). For example, a predicted label $\hat{y}_i = f(x_i)$ can be computed for a sample input $x_i$, and can be compared with a known classification $y_i$ of the input sample. Note that the accuracy of the test set may depend on the initial partition of the training set and test set, and thus the process can be repeated multiple times to enhance predictability.

In some embodiments, the training process can be used to determine values for hyperparameters of the model being used (e.g., $\lambda$ for logistic classification, C for linear SVM, C and $\gamma$ for nonlinear SVM, $\lambda$ and network layout for ANN). This procedure is sometimes referred to as model selection. Any suitable model selection technique(s) can be used. For example, k-fold cross validation can be used, in which the whole training set is split into k equal folders. For each specific choice of hyperparameters, the model is trained using k−1 folders, and evaluated with the remaining folder as a validation set. This process can be repeated by cycling through the training set. Accordingly, for each specific choice of hyperparameters, k models are built and evaluated. The performance the specific choice of the hyperparameters can evaluated by averaging the accuracy of these k models, and the optimal hyperparameters (of those calculated) can be selected by looping over different hyperparameter choices.

At 414, process 400 can test the trained classifier using at least a portion of the features corresponding to images from the test samples with known classifications. For example, as described above, a particular model can be trained and validated using a training dataset, and process 400 can use the test dataset to determine the accuracy of the model on images that were not used in determining the hyperparameters of the model.

At 416, process 400 can determine the accuracy of the trained model over the test samples, and can determine whether to discontinue training (e.g., because a particular level of accuracy has been reached, because the accuracy has not improved by a particular amount over a particular number of epochs, because the hyperparameters are diverging rather than converging etc.).

If process 400 determines that training is to be discontinued ("YES" at 418), process 400 can end at 420. Otherwise, if process 400 determines that training is to be continued ("NO" at 418), process 400 can return to 412 and continue to train the classification model (e.g., using a different partitioning of training and validation samples from the training set).

Figure 5:
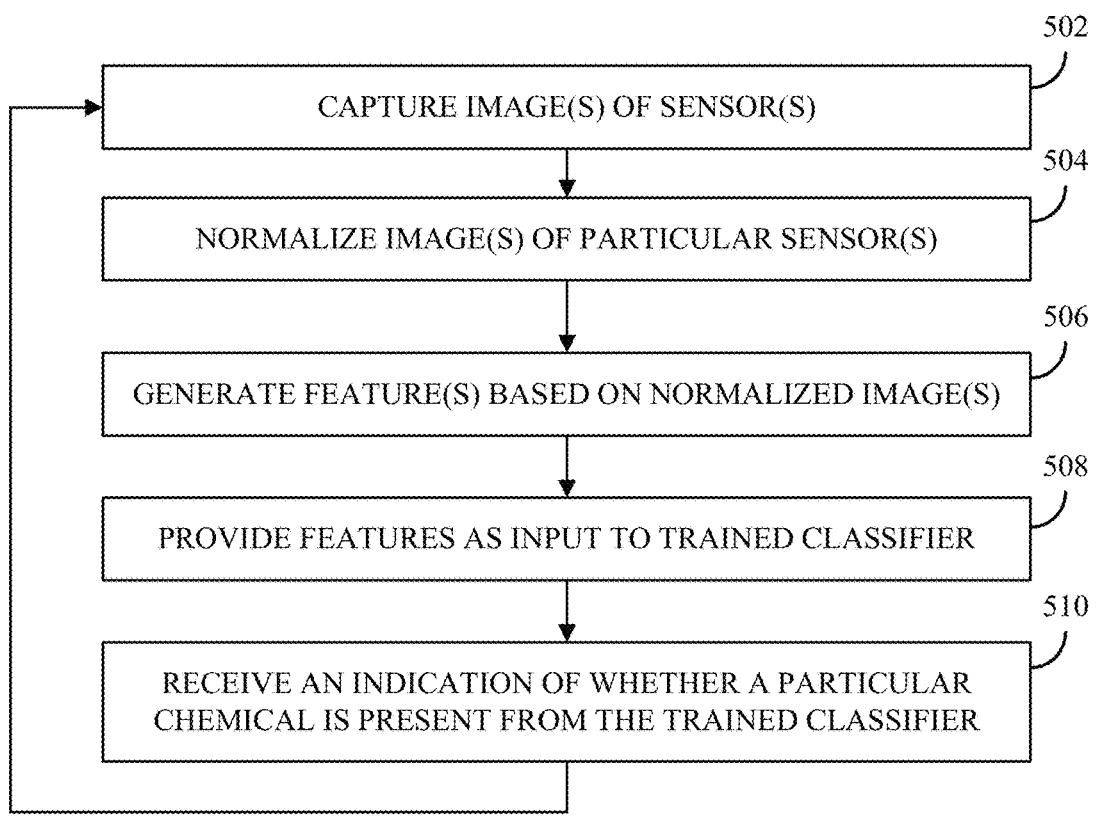
FIG. 5 shows an example of a process for detecting the presence of an analyte using a trained classification model in accordance with some embodiments of the disclosed subject matter.

FIG. 5 shows an example 500 of a process for detecting the presence of an analyte using a trained classification model in accordance with some embodiments of the disclosed subject matter. At 502, process 500 can capture (or receive) an image of one or more liquid crystal sensors that are configured to change orientation in the presence of a particular chemical.

At 504, process 500 can normalize the image(s) using similar techniques to what was used to normalize the images during training of the classification model.

At 506, process 500 can generate features based on the normalized image(s). For example, process 500 can generate features corresponding to the features used to train the classification model. For example, one or more of the features described above in connection with 408 of FIG. 4.

At 508, process 500 can provide the features to the classification model as input using any suitable technique or combination of techniques. For example, process 500 can format the features as a vector, and can provide the vector to the classification model. In some embodiments, the trained classification model can use the trained parameters of the classification model (e.g., w* and $\gamma$*) to predict the classification label $\gamma_s$ given a feature vector $x_s$ of a new test sample (i.e., a sample not included in the training set). This task involves relatively minor computing operations (extract features using the data of the given sample and predict the category of the sample). Such operations can be performed on the cloud (remotely) and in real-time to keep in situ hardware requirements at a minimum. The sensor accuracy is measured in terms of the number of correct predictions and, in the case of binary classification, we are also often interested in the proportion of false positives and negatives.

At 510, process 500 can receive an indication from the trained classification model of the likelihood that a particular chemical is present. For example, the output of the classification model can provide one value indicating the likelihood that a first chemical (e.g., DMMP) is present, and another likelihood indicating the likelihood that a second chemical (e.g., water) is present. Based on the individual likelihoods, process 500 can determine whether the chemical of interest (e.g., DMMP, sarin gas, etc.).

Figure 6:
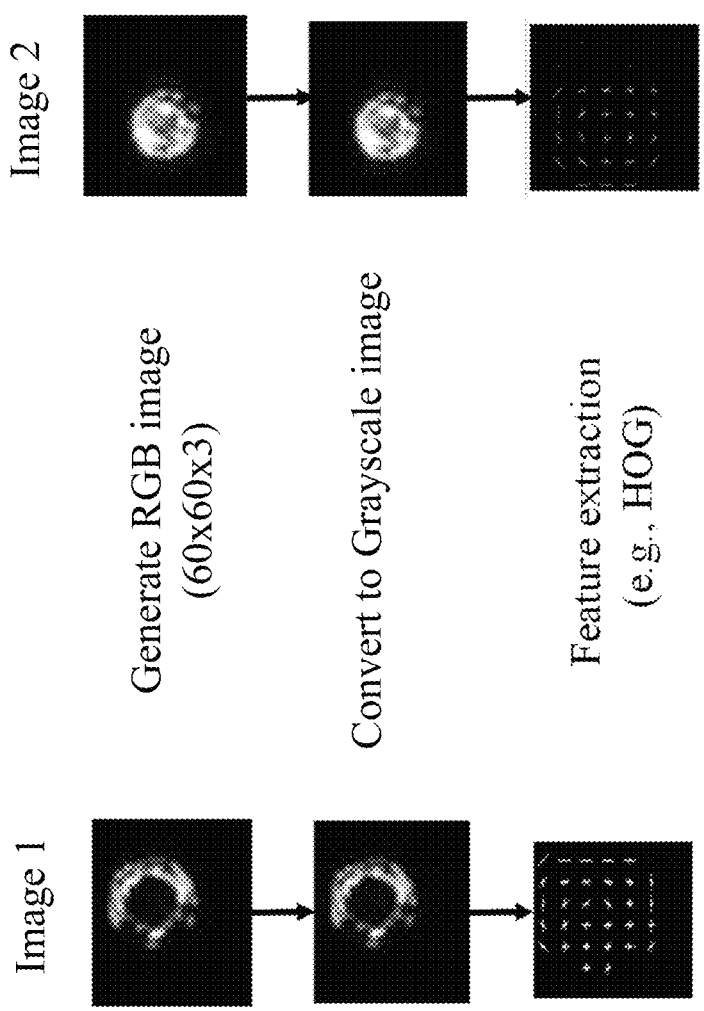
FIG. 6 shows an example of a process of normalizing two different images of micro-wells for feature extraction in accordance with some embodiments of the disclosed subject matter.

FIG. 6 shows an example of a process of normalizing two different images of micro-wells for feature extraction in accordance with some embodiments of the disclosed subject matter. As shown in FIG. 6, color images received can be converted to 60×60 pixel RGB images (e.g., having 60 columns, 60 rows, and 3 colors pixel) of individual micro-wells. Note that, in some embodiments, conversion to an RGB image can include a color space conversion. For example, if the received image has a format that represents color information using different colors and/or different information, such as YCbCr (where Y is a luminance component, and Cb and Cr are chrominance components), or a color space based on cyan, magenta, and yellow, or any other suitable color space, In some embodiments, this can involve reducing the resolution when the image of a particular micro-well is at a higher resolution. In some embodiments, the RGB images can be used to generate grayscale images (e.g., 60×60 grayscale images). Note that, in some embodiments, the image can be received as a grayscale image (e.g., when a monochromatic image is generated by the image sensor, when the image has already been converted to grayscale, etc.). In some embodiments, the grayscale image can be used to generate one or more features (e.g., a HOG, a vector or matrix of pixel brightness values, mean intensity, etc.). Additionally, RGB image can be used to generate one or more additional features (e.g., mean intensity of the image, mean intensity of each color channel, features received from an object detection deep learning neural network, etc.). In some embodiments, channels other than RGB can be used, in addition to or in lieu of red, green, and blue channels. For example, YCbCr images can be used to generate one or more additional features.

FIG. 7A shows an example of oriented gradients calculated at various points in an image of a micro-well in accordance with some embodiments of the disclosed subject matter. As described above, a histogram of such oriented gradient values can be used as features for a classification model.

Figure 7B:
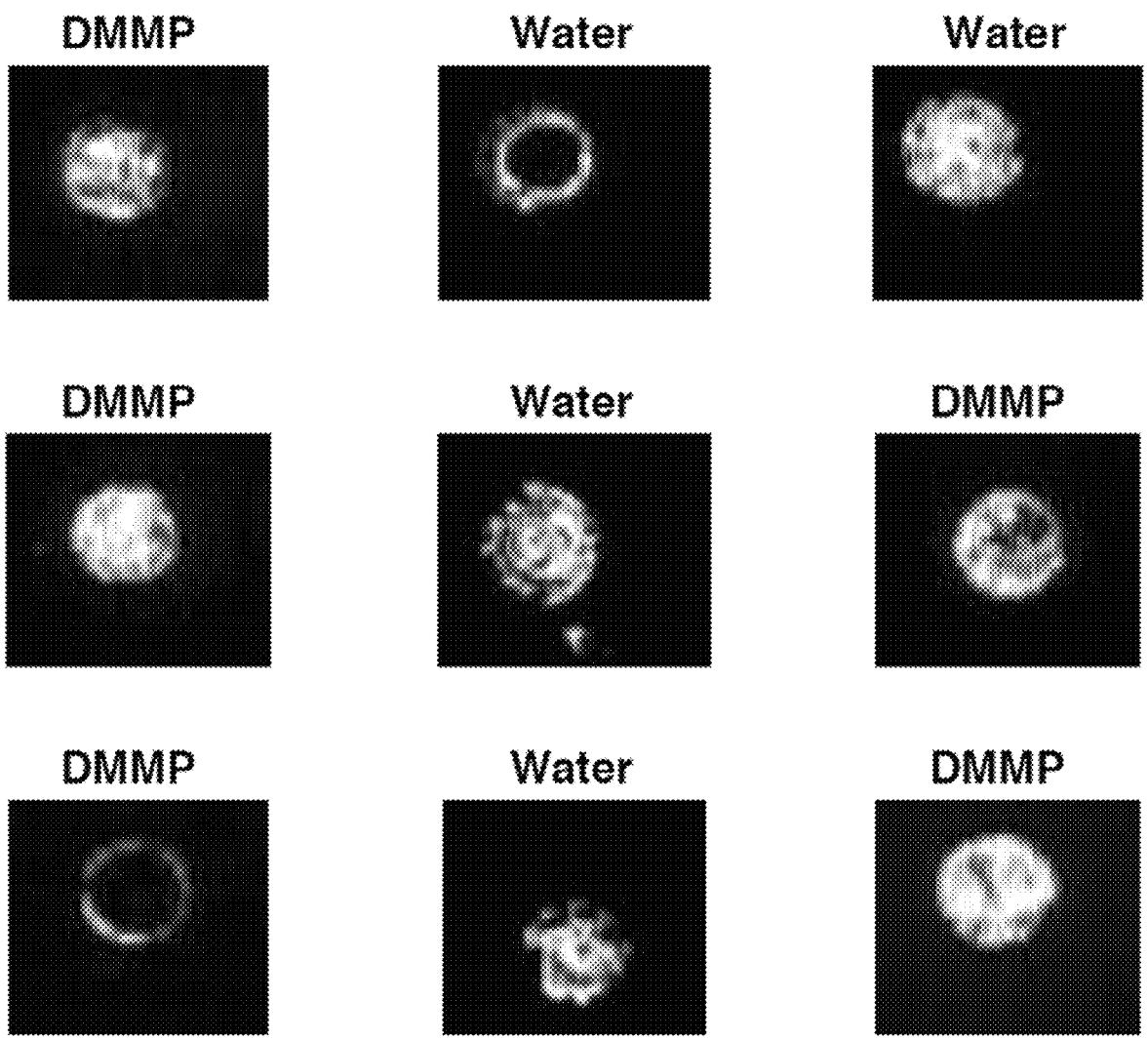
FIG. 7B shows examples of images of individual microwells after exposure to either $N_2$-water or DMMP.

FIG. 7B shows examples of images of individual microwells after exposure to either $N_2$-water or DMMP. As shown, some visual differences may be apparent to human observers, but other images look very similar (e.g., the top right well that was exposed to water looks very similar to the wells at the middle left and bottom right that were exposed to DMMP).

Figure 7C:
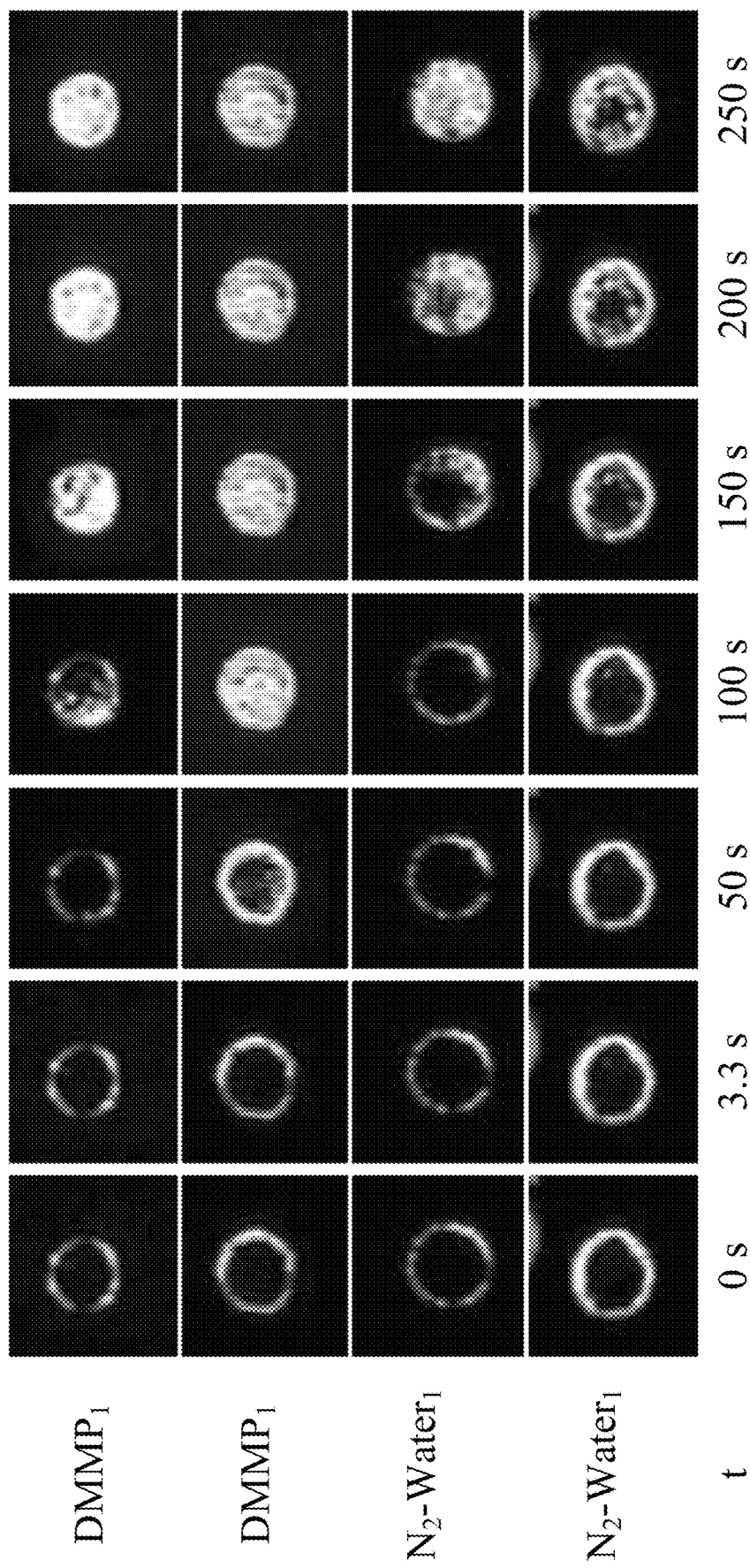
FIG. 7C shows examples of the evolution of the visual appearance of particular microwells over time after either $N_2$-water or DMMP.

FIG. 7C shows examples of the evolution of the visual appearance of particular microwells over time after either $N_2$-water or DMMP. As shown, the wells exposed to DMMP appear to change more rapidly in response to exposure than the wells exposed to water.

FIG. 8 shows an example network topology of a convolution neural network that can be used to generate features for use in accordance with some embodiments of the disclosed subject matter. An example of a particular network with a topology represented in FIG. 8 is described in more detail in Krizhevsky et al., "ImageNet Classification with Deep Convolution Neural Networks," Advances in Neural Information Processing Systems 25, 2012, which is hereby incorporated herein in its entirety.

FIGS. 9-17 show example results achieved by systems implemented in accordance with some embodiments of the disclosed subject matter. Six videos were created that show the response of liquid crystal sensors DMMP-N2, and six other videos were created that show the response of the liquid crystal sensors to water-N2. Each group of six videos includes the evolution of 391 micro-wells, and still images were extracted from the videos every 3.3 seconds. Several different images were generated from each frame, with each of those images including information of a single micro-well at a specific point in time. Each image of an individual micro-well was converted to a 60×60 image, with the total number of images generated from the twelve videos generated (the total image population) is 75,081.

The liquid crystal filled micro-wells were exposed to a stream of dry N2 including DMMP at 10 ppmv within a flow cell with glass windows that permitted characterization of the optical appearance of the LC using a polarized optical microscope. The gas containing DMMP was delivered to the flow cell at 300 mL/min using a rotameter (Aalborg Instruments and Control, Orangeburg, N.Y.). Nitrogen gas including water vapor at 30% relative humidity was delivered to the flow cell at 300 mL/min with the same rotameter. The optical appearance of the liquid crystal micro-wells were recorded using an Olympus C2040Zoom camera (obtained from Olympus Corporation, Melville, N.Y.) and WinTV software (Hauppauge, N.Y.).

Figures 9, 10:
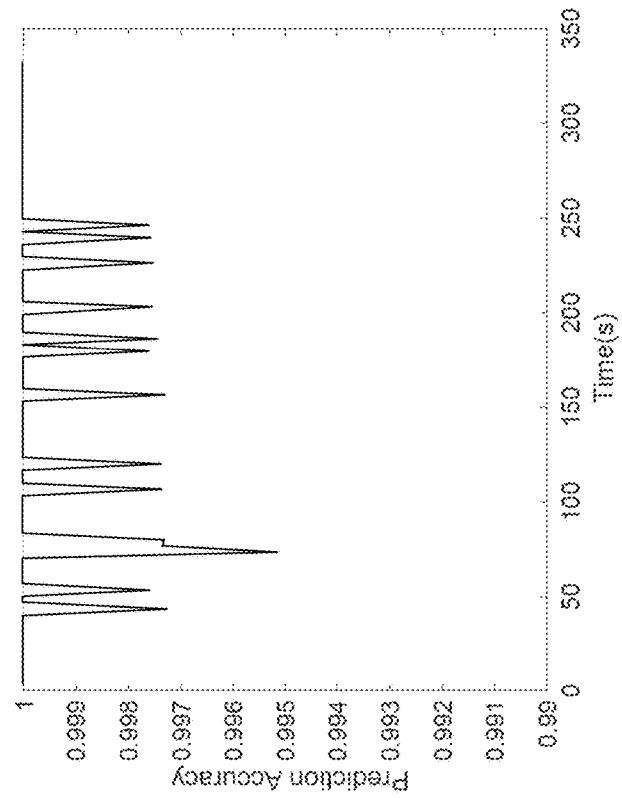

Classification models were trained using functions available in Matlab (version 9.5.0.197613). A key factor that affected the classification accuracy of the classification models was the selection of the training set. With a population of 75,081 training images available (which capture responses for different micro-wells and at different times), selection of the training set is tightly connected to the way data is collected from experimental equipment to train the classifier. For example, it is desirable to be able to use the trained classifier to classify a similarly configured micro-well that was not used to train the classifier (e.g., a micro-well produced by another manufacturer, or at a different time). To evaluate the effect of data collection procedures, two partitioning strategies of the available images were compared. The first strategy included selecting images at random over the entire image population (i.e., including the entire set of micro-wells), while in the second strategy included selecting micro-wells at random (i.e., using all of images associated with a particular micro-well as training images if the micro-well is selected for inclusion in the training sample) to create the training set. In general, the second approach would be expected to have more redundant data, as images of a given micro-well would be expected to have more correlation. The second selection strategy, however, corresponds to a realistic scenario in which data availability is constrained. Additionally, the performance of the classifiers using different combinations of features was evaluated, with different sizes of training sets, and different machine learning techniques (i.e., different types of models). Additionally, the classifier was trained using different types (and combinations) of feature information, with feature extraction tasks performed using existing capabilities in Matlab (version R2015a). Classification tasks were performed using tools available in Matlab and advanced optimization solvers such as Ipopt, PIPS-NLP, and IPCluster. For example, a linear SVM classifier (with an initial hyper-parameter C=1) was trained using various features, including (I) average intensity of RGB channels, (II) HOG features, (III) deep learning features (e.g., outputs of the last hidden layer of Alexnet when a 60×60 image of the micro-well was provided to the input layer), and (IV) individual grayscale intensity values. The total number of features extracted for the four types of features (I-IV) at each point in time was 8,599. Spatial patterns of the RGB channels were not captured, as this would raise the number of features by nearly a factor of three. However, the HOG (II) and grayscale pixel features (IV) capture at least a portion of any spatial patterns. In one example, 80% of the total image population were selected as the training set, the remaining 20% were used as the test set. The random selection process was repeated five times to ensure reproducibility and performance is summarized in FIG. 9. As seen in FIG. 9, the overall classification accuracy (denoted as Test Accuracy) was as high as 99.95%. DMMP Accuracy denotes the correct classification of DMMP presence, while Water Accuracy denotes the correct classification of water presence. Note that 1-DMMP Accuracy is sometimes referred to as a type II error (i.e., a false negative), while 1-Water Accuracy is sometimes referred to as a type I error (i.e., a false positive). Note that the training accuracy is 100%, which indicates that the features used provide enough information to make a perfect classification of the images. FIG. 10 shows an example of DMMP accuracy of the trained SVM in classifying the test set, with the results correlated with the time when each image appears in the videos. For example, the accuracy result at 3.3 seconds corresponds to the accuracy of the SVM in classifying the presence of DMMP across all images of micro-wells 3.3 seconds after the chemical was introduced. As shown in FIG. 10, the accuracy is nearly 100% at the first frame (i.e., 3.3 seconds after the flow was started). This can have important practical implications, as it suggests that classification can be achieved nearly instantaneously (i.e., without the need of running a lengthy experiment to record the response of the liquid crystal sensor).

In some embodiments, using one or more static strategies can overcome certain limitations of dynamic counterpart strategies (described below in connection with FIG. 15) by classifying liquid crystal responses based on instantaneous time snapshots (e.g., rather than using a time series). For example, such static strategies can operated based on differences in spatial patterns that are sufficient to identify the presence of DMMP or $N_2$-water (examples showing such differences are described above in connection with FIG. 7B), although such differences are generally difficult for a human observer to detect (particularly early in the responses). In some embodiments, such static strategies can be more time (and cost) efficient due to the ability to classify the sample using a single sample image, rather than capturing a series of images (e.g., over a time period of minutes) which can accelerate sensing (and can more efficiently utilize computing resources by analyzing multiple samples during the time it would take to analyze a single sample using a dynamic strategy). Additionally, such static strategies do not accumulate feature information over time (e.g., if all sources of feature information described herein are used, only 8,599 features are produced per sample). Two training set selection cases were evaluated to determine how quality of training data may affect sensor accuracy. In one particular example (sometimes referred to herein as "static (a)"), the entire image population was partitioned at random to create a training set and a testing set. In another particular example (referred to herein as "static (b)"), the entire image population was partitioned by micro-wells. In such an example, data from a subset of micro-wells was used for training, and data from an independent set of micro-wells was used for testing. Note that the static (b) selection strategy can be expected to have more spatially correlated data (e.g., because it contains more redundancy and less information) compared to the static (a) counterpart. This comparison can facilitate efforts to quantify impacts of quality of the training data.

Figures 11, 12:
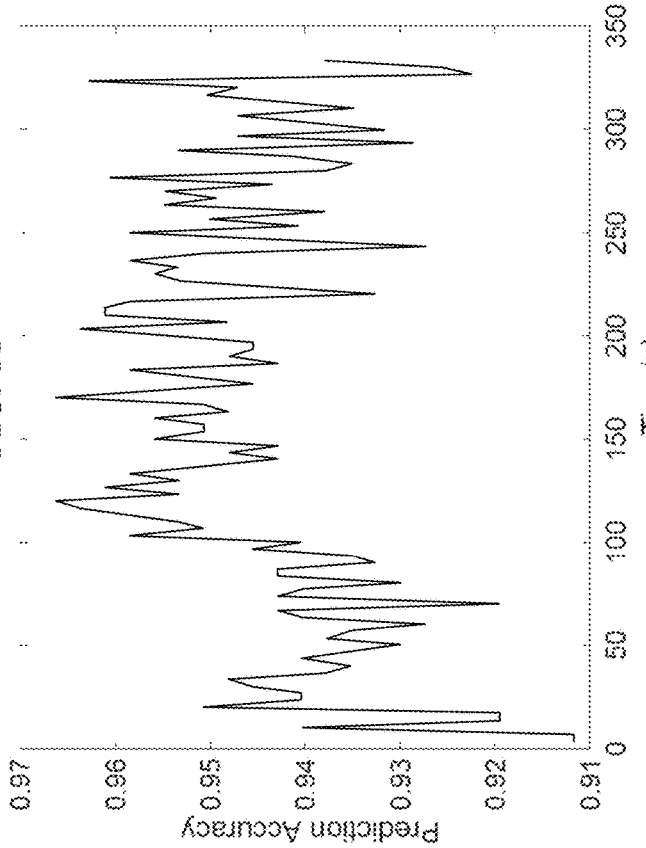

An experiment using a dynamic strategy produced accuracies of 78% after just 3.3 seconds, which may indicate that there is a non-trivial amount of information embedded in the early response of a liquid crystal sensor that can be used to classify the samples more quickly. This is reinforced when using static classification strategies (e.g., as shown in FIGS. 10 and 12, which show relatively high classification accuracy at a first image captured 3.3 seconds after exposure of the liquid crystal sensor to a chemical to be detected.

In another example, 80% of the micro-wells were randomly selected as training wells, and the rest of the wells were used as test wells. The random selection process was repeated five times and the results are summarized in FIG. 11. As shown, the overall classification accuracy decreases to 95%, which suggests that the use of more correlated (i.e., less informative) data in the learning process may result in lower accuracy. FIG. 12 shows that the accuracy at 3.3 seconds is above 91% but significant volatility is observed at different times. Using more micro-wells to train the classifier may increase accuracy, and ultimately reach classification accuracies above 99%. However, such an approach also require more time-consuming data collection.

Note that the training classification is relatively high (i.e., 99.46%), providing additional evidence that features I, II, and III are highly informative. The predicted classification accuracy, however, only reached 95% for images at t=200 seconds and accuracy reached levels of only 91% for images at t=3.3 seconds (as shown in FIG. 12). The decreased accuracy may be the result of using more correlated (and thus less informative) data. This can facilitate quantification of the effects of using lower quality training data in the learning (training) process.

FIG. 13 shows the effect of using various numbers of samples for training with selection by micro-well. As shown in FIG. 13, an accuracy of 95% was achieved if 80% of the data (i.e., 312 micro-wells or 60,064 images) were used as training samples, whereas, if only 20% of the data (i.e., 79 micro-wells or 15,017 images) were used as training samples, the accuracy dropped to 87.47%.

FIG. 14 shows the effect of using various different machine learning classification techniques. As shown in FIG. 14, linear SVM (described above) was compared with logistic classification, nonlinear SVM, and a neural network ANN. The images were partitioned by micro-wells, and 80% of the micro-wells were used for training. For nonlinear SVM, a Gaussian kernel was used. For the neural network, the input layer used the RGB (true color) image, and the hidden layers were a sequence of convolution2dLayer, maxPooling2dLayer, fullyConnectedLayer, reluLayer, and softmaxLayer. The time to solve the optimization problems using the various techniques varied significantly. For example, logistic classification required about 10 minutes for training the classifier, whereas linear SVM required about 30 minutes, nonlinear SVM required about 2 hours, and the neural network required about 2 days. In addition, in the model selection phase, a sequence of classification problems were solved, where the number of classification problems in each round equaled k (with five used in this example) times the number of combinations of hyperparameters. Four different values for C were tested in linear SVM, four different values of λ were tested in logistic classification, three different values of C and three different value of γ were tested for nonlinear SVM, and two different values of λ for the neural network. For the neural network, the process was performed only once (k=1) because the solution time per classification problem was very long.

As shown in FIG. 14, linear SVM was the superior technique, achieving classification accuracies above 95%. The performance of nonlinear SVM was relatively close to that of linear SVM, but took significantly more time to train. Logistic regression only achieved accuracies of about 92%, while the neural network only achieved 83% accuracy. Note that it may be possible to achieve better accuracy with a neural network by better tuning the network layout, but this would require a substantial time investment to investigate various layouts given the extended training time.

FIG. 15 shows examples of classification accuracy using color channel information and a dynamic strategy. An RGB image (micrograph) collected at a given time instance has three channels: red (R), green (G), and blue (B). The brightness field in each channel can be represented as a matrix in which each element corresponds to one pixel, and this matrix can capture spatial patterns. The spatial field was averaged for each channel to obtain a feature for each channel (that we call the average RGB intensities), which generated three features at each point in time (i.e., every 3.3.

seconds). The average of the three average intensities were also calculated to obtain the average total intensity.

Figure 19:
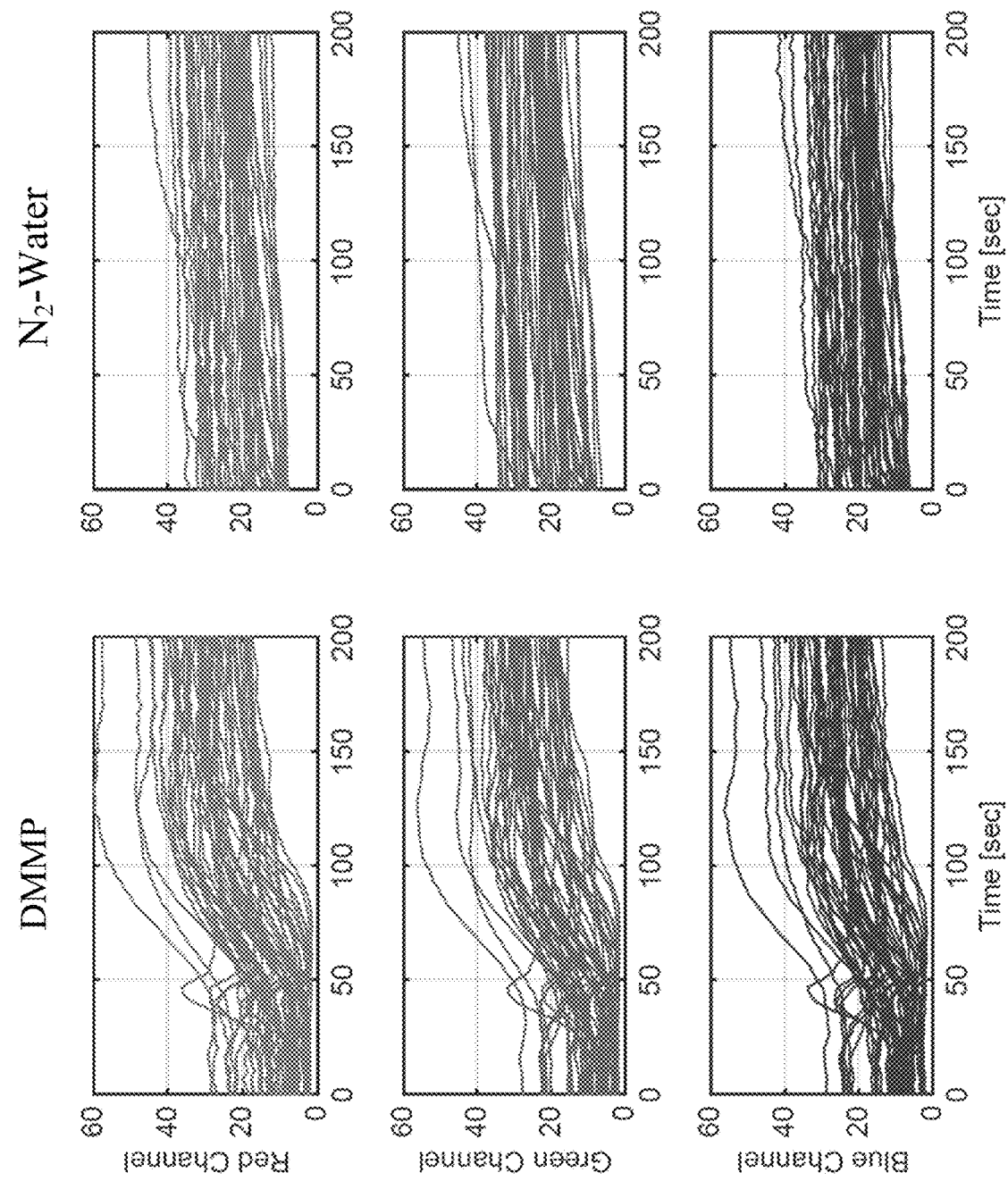
FIG. 19 shows examples of average intensity on various color channels over time in images of liquid crystal sensors exposed to DMMP and $N_2$-water over time.

In some embodiments, a dynamic strategy can classify a response based on average RGB feature information (I) that is accumulated during the evolution of the liquid crystal sensor response after exposure to a chemical. This dynamic strategy can utilize a difference in response speed by the liquid crystal sensors to $N_2$-water, which tends to be slower, and to DMMP, which tends to be faster. For example, as shown in FIG. 7C, when exposed to DMMP, the depicted liquid crystal sensors took around 100 to 150 seconds to change in appearance from a ring to a full moon appearance, whereas a similar transition in response to $N_2$-water took over 250 seconds. In light of these differences, the evolution of average intensity is different in response to DMMP and water, which is depicted in FIG. 19 showing that the evolution of the average RGB channels in response to $N_2$-water are smoother than the responses to DMMP. Accordingly, it can be expected that the shape of the dynamic profiles of the RGB channels can provide valuable information to perform classification. However, from the nature of the dynamic responses it is apparent that the DMMP responses exhibit relatively high variability from sample to sample, which can be attributed to differences in the initial conditions of the liquid crystal when the DMMP was introduced and to variations in the sample and surface, which are difficult to control experimentally (as seen in the initial states of the RGB channels shown in FIG. 19). It is also apparent that, for a given sample, the differences in the evolution of the average RGB intensities are not as marked suggesting that significant redundancy in these features exists. Note that the accuracy of the dynamic classification strategy is tied to the slow dynamics of the LC response, and the dynamic strategy can accumulate many more features than were used in the static strategy described above. For example, if all feature information described herein (e.g., mean RGB channel brightness, HOG features, deep learning features, and grayscale pixel brightness) were accumulated during the entire response, each training sample would be associated with 524,539 features, which may cause any classification models to be intractable and which may also lead to overfitting (overparameterization).

In some embodiments, each training sample for the dynamic strategy can capture cumulative feature information of one micro-well up to a given time t. In one particular example, data from 391 samples (micro-wells) was used to train a dynamic classifier, of which 80% were randomly selected as the training set with the remaining 20% used as the test set. This random selection was repeated five times (i.e., to produce five different training sets, and five different test sets, each of which can be used to train a classification model). For each micro-well, the features used to generate the results shown in FIG. 15 were the average RGB intensities of multiple images recorded up to time t. For example, for a response lasting 200 seconds, feature information from 61 images (collected every 3.3. seconds) was used with each image being associated with three average RGB intensities. Accordingly, the total number of features used for a response up to time t=3.3 seconds is 3, for t=100 seconds is 91, and for t=200 seconds is 183. A linear SVM classifier was trained using this data, without using other feature information (HOG, deep learning, and grayscale pixels) due to the extremely large number of features that would be produced. However, using only average RGB channel brightness, the results show the dynamic response of the liquid crystal sensor contains valuable information that can be used to conduct classification.

Figure 20:
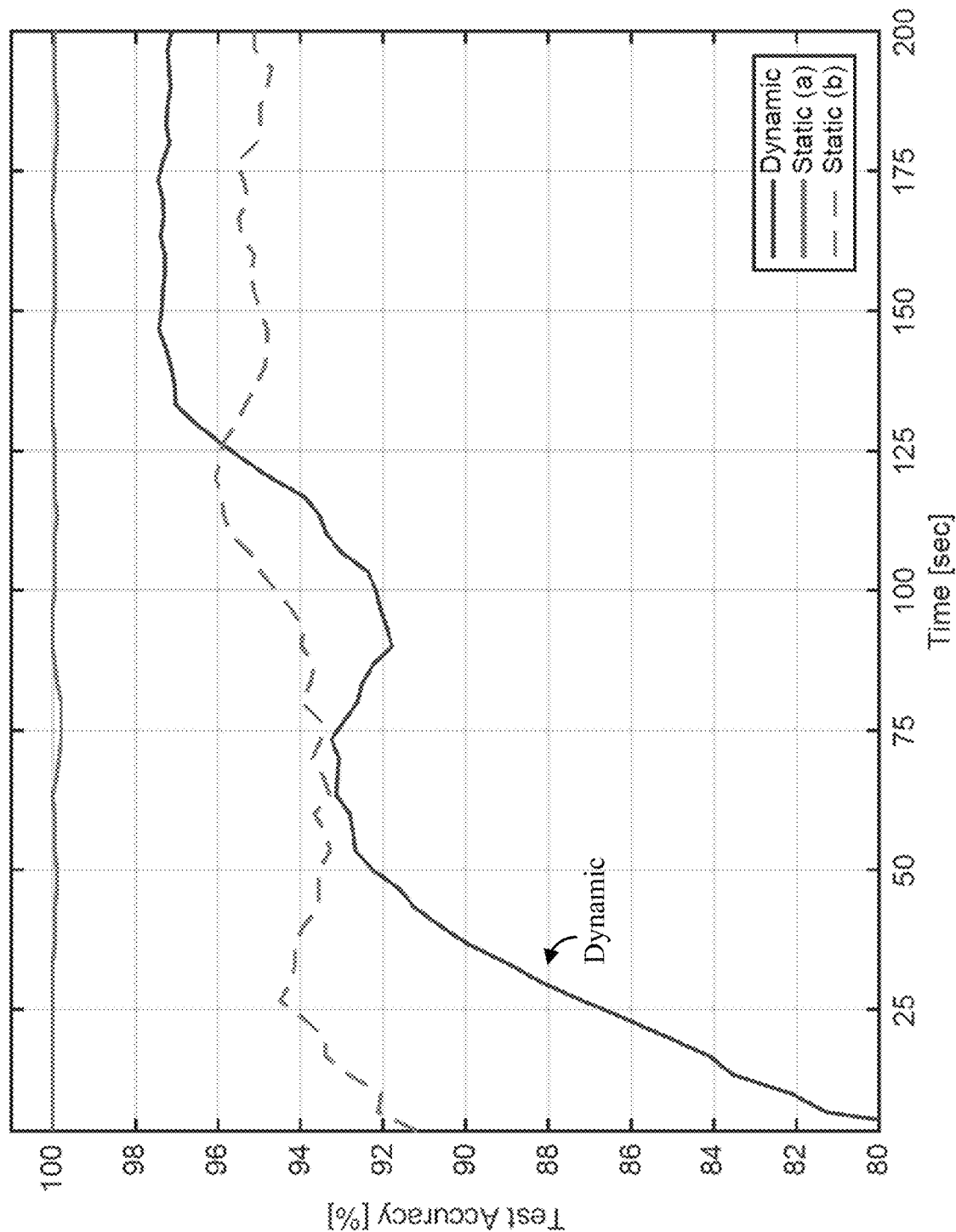
FIG. 20 shows examples of average classification accuracy on a "test" set of images over time for various strategies.

FIG. 20 shows that the testing classification accuracy achieved after t=3.3 seconds for the dynamic strategy that was tested is only 78%, and after t=200 seconds it reached 97%. Note that the training accuracy was 100% for t=200 seconds (as shown in FIG. 15), which indicates that RGB feature information may be sufficient to perfectly categorize the images. However, as shown in FIG. 15, there is variability in the testing classification accuracy when using different training sets (e.g., ranging from 95% to 100%), which is likely due to significant variability in the dynamic responses of liquid crystal exposed to DMMP from sample to sample, which can increase the important of training set selection to insure that it is representative of such variability.

FIG. 16 shows examples of the effect of feature information on classification accuracy. As shown in FIG. 16, using different combinations of features can produce classification models with varying degrees of accuracy. Although not shown, it was also determined that combining all of features I-IV did not improve this performance, and that the use of average total RGB intensity alone provided very low accuracies (of around 60%). Note that average brightness has been widely used by experimental researchers to classify liquid crystal responses, and these results indicate that is likely an inferior feature to use alone. The HOG feature information (II) likely contribute to increased accuracy due to such features capturing spatial patterns that develop relatively early in the liquid crystal response. Such patterns, however, are not sufficient to achieve high accuracies. Features generated by AlexNet (III) likely contribute to increased accuracy due to highly evolved features generated by such a system, such as texture, edges, and blobs. Note that it is difficult (or impossible) to ascribe direct physical interpretations to such evolved features generated by a deep neural network.

FIG. 17 shows examples of computational performance related to the use of different optimization solvers for training a support vector machine instance. As shown in FIG. 17, computational performance is compared for different optimization solvers for a large linear SVM classification instance that comprises 37,540 training samples and 4,997 features. These experiments were run on a multi-core computing server with 32 cores. As shown, the off-the-shelf interior-point solver Ipopt was not able to solve the problem because it ran out of memory as the linear algebra system became too large to be handled all-at-once. The parallel Schur decomposition strategy implemented in PIPS-NLP bypassed the memory obstacle, but required more than twelve hours to solve the problem to a tolerance of $1 \times 10^{-5}$ due to dense linear algebra operations that are involved. The clustering-based preconditioner used in IPCluster reduced the solution time to 4.8 minutes and achieved the same tolerance of $1 \times 10^{-5}$. Notably, the preconditioner only used 1% of the training samples, indicating that high redundancy exists in the feature information. Another surprising result is that the SMO technique (tailored to SVM problems) only reached a tolerance of $1 \times 10^{-1}$ after an hour. These results suggest that drastic reductions in computing time and accuracy can be achieved with advanced optimization solvers.

Figure 18:
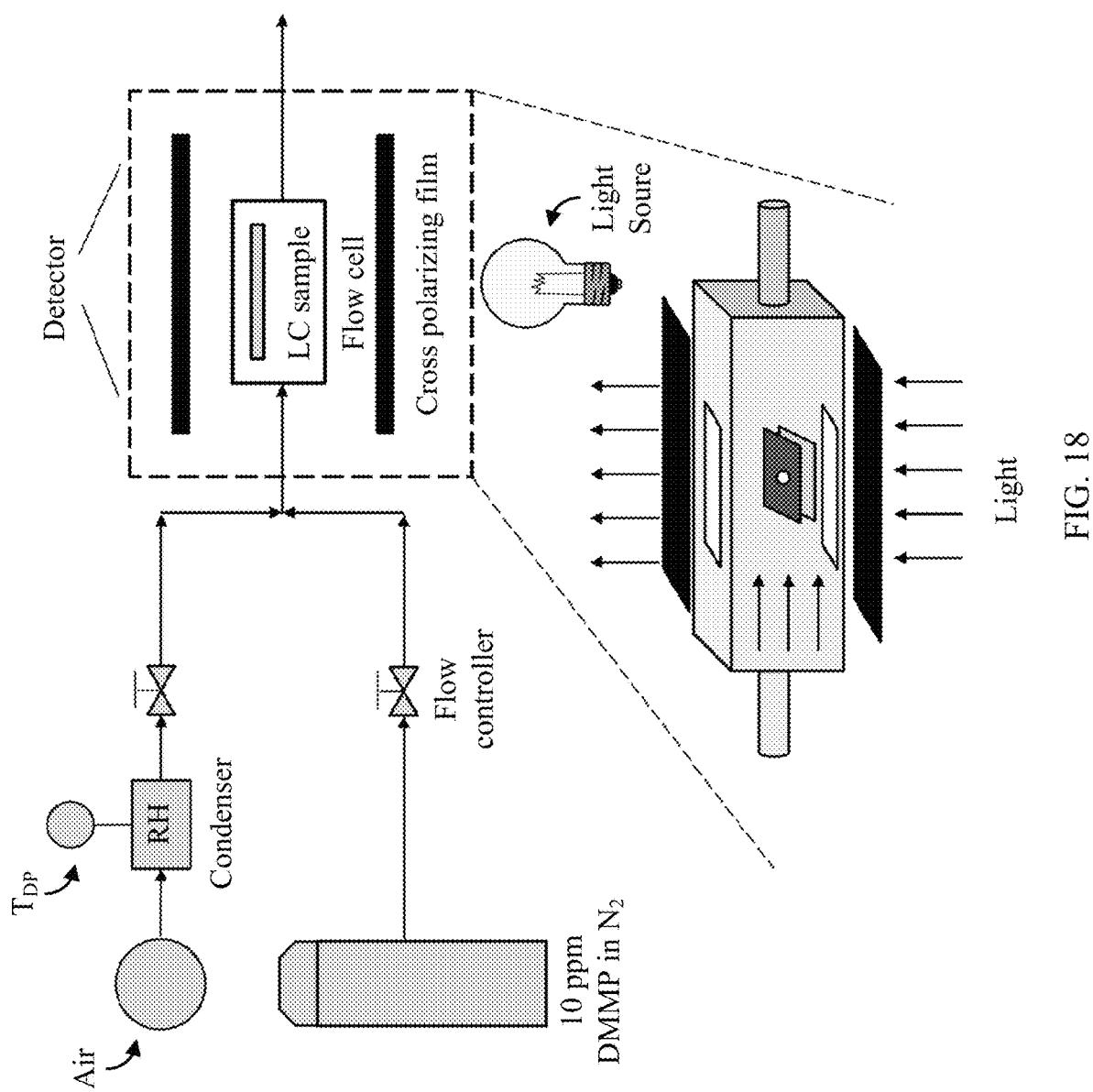
FIG. 18 shows an example experimental setup that can be used to generate image data for training and/or testing of mechanisms for detecting the presence of an analyte.

FIG. 18 shows an example experimental setup that can be used to generate image data for training and/or testing of mechanisms for detecting the presence of an analyte. As shown in FIG. 18, the experimental setup includes a light source that directs light through a liquid crystal sensor toward an image sensor (detector) while an $N_2$-DMMP mixture or 30% relative humidity sample of air was passed over the liquid crystal sensor. Six videos were recorded that depict the response of liquid crystal sensors to $N_2$-DMMP at 10 ppm (these videos varied in length from 4 to 13 minutes) and six videos were recorded that depict the response of the liquid crystal sensors to $N_2$-water (these videos varied in length from 7 to 30 minutes). Each video tracked the dynamic evolution of multiple independent micro-wells (the total number of micro-wells recorded was 391). A frame (micrograph) was captured from each video every 3.3 seconds, and each frame was subdivided into several images, each depicting the entirety of a single micro-well at a specific time. The total number of micro-well images generated was 75,081 and each image was resized to 60×60 pixels (e.g., several such images are depicted in FIGS. 7B and 7C).

The experimental procedure followed to obtain liquid crystal response data involved various components and procedures. For example, 5CB was purchased from HCCH (Jiangsu Hecheng Display Technology Co., LTD). The developers SU-8 2050 and SU-8 were purchased from MicroChem (Westborough, Mass.). Absolute ethanol (anhydrous, 200 proof) and aluminum(III) perchlorate salt in its highest available purity form were purchased from Sigma-Aldrich. (Tridecafluoro-1,1,2,2-tetrahydrooctyl)-trichlorosilane was purchased from Pfaltz & Bauer (Waterbury, Conn.). DMMP in nitrogen at a concentration of 10 ppmv was obtained from Airgas (Radnor, Pa.) and used as received. Fischer's finest glass slides were purchased from Fischer Scientific (Hampton, N.H.). All chemicals and solvents were of analytical reagent grade and were used as received without any further purification. All deionized water used in the study possessed a resistivity of at least 18.2 MΩ cm.

As another example, polymeric wells with diameters of 200 μm were fabricated by photolithography to create liquid crystal films supported on metal salt surfaces. SU-8 2005, which contains 45 wt % bisphenol A novolac epoxy, was made by adding cyclopentanone to SU-8 2050, which contains 71.65 wt % bisphenol A novolac epoxy, to decrease the viscosity of the photoresist. Then, a thin film of SU-8 2005 was deposited on a cleaned glass surface by spin-coating at 500 rpm for 10 seconds followed by 3,000 rpm for 30 seconds. The polymer-coated surface was subsequently pre-baked on a hot plate at 95° C. for 5 minutes and then cooled to room temperature for 10 minutes. After prebaking, a photomask with 200 μm-diameter dark circular patterns was placed on the polymer coated surface and exposed to UV for 70 seconds (X, =254 nm, UV crosslinker, Spectronics, Westbury, N.Y.). After UV exposure, the sample was post-baked for 7 minutes at 95° C. The SU-8 film was exposed to an oxygen plasma (250 Watt RF power, 50 cm³/min oxygen) and subsequently placed into a desiccator to which 25 liters of (tridecafluoro-1,1,2,2-tetrahydrooctyl)-trichlorosilane was added (adjacent to the SU-8 film). A vacuum was then pulled in the desiccator for 20 minutes, during which time the organosilane formed a vapor and reacted with the surface of the SU-8 film. After the surface treatment, the sample was placed in a SU-8 developer (1-methoxy-2-propyl acetate) and sonicated for 15 seconds to dissolve the regions of the SU-8 film that were not exposed to UV light. The sample was then washed with a copious amount of isopropanol and dried under a gaseous flow of nitrogen. The depth of the polymeric microwells fabricated using the aforementioned procedure was determined to be 5 μm by surface profilometry.

As yet another example, films of liquid crystal supported on metal-salt decorated surfaces were deposited within the wells. Aluminum perchlorate salts were dissolved into dry ethanol to form 10 mM solution, and then 50 μL of solution was deposited by spin-coating (at 3000 rpm for 30 seconds) onto the glass surfaces at the bottom of the polymeric microwells. Next, the microwells were filled with liquid crystal by depositing 2 μL of liquid crystal onto each array of microwells using a micropipette. Excess liquid crystal was removed from the array by wicking into a microcapillary.

As still another example, the LC-filled microwells were exposed to a stream of dry $N_2$ containing DMMP (at 10 ppmv) within a flow cell with glass windows that permitted characterization of the optical appearance of the liquid crystal using a polarized optical microscope. The gas containing DMMP was delivered to the flow cell at 300 mL/min using a rotameter (Aalborg Instruments and Control, Orangeburg, N.Y.). For experiments performed to evaluate the response of the liquid crystals to water vapor, nitrogen containing 30% relative humidity (RH) was delivered to the flow cell at 300 mL/min with the same rotameter. The RH of the air was controlled using a portable dew point ($T_{DP}$) generator (LI-610, LI-COR Biosciences, Lincoln, Nebr.). To generate 30% RH gas stream, the temperature of the gas fed to the generator was controlled at 25° C. and the dew point was set as 6.2° C. The optical appearance of the liquid crystal film was recorded using an Olympus camera (Olympus C2040Zoom, Melville, N.Y.) and WinTV software (Hauppauge, N.Y.).

In a further example, the optical appearance of the liquid crystal was characterized using an Olympus BX-60 polarizing light microscope in transmission mode (Olympus, Japan). Conoscopic imaging of the liquid crystal films was performed by inserting a Bertran lens into the optical path of a polarized-light microscope to distinguish between homeotropic and isotropic films.

FIG. 19 shows examples of average intensity on various color channels over time in images of liquid crystal sensors exposed to DMMP and $N_2$-water over time. As shown, in the presence of the DMMP the average intensity on each channel relatively rapidly increased after a relatively short period of time (e.g., within one to two minutes), whereas in the presence of the $N_2$-water the average intensity increased much more gradually.

FIG. 20 shows examples of average classification accuracy on a "test" set of images over time for various strategies. The results depict how classification accuracy changes as a model receives input data from successive images of the same well over the 200 second period. For example, the "static (a)" model predicted to which of the two classes an image of a microwell belongs with nearly 100% accuracy regardless of the length of time between exposure to the chemical and capture of the image. As shown, the most accurate model was trained using the "static(a)" strategy, which involved randomly dividing microwells into test and training sets, whereas the "static(b)" strategy involved randomly dividing the set of all images of microwells into test and training sets. By contrast, as described above, the dynamic strategy involved training a model using average RGB channel intensities over time, rather than instantaneous intensity patterns within a single image of the microwell.

Figure 21:
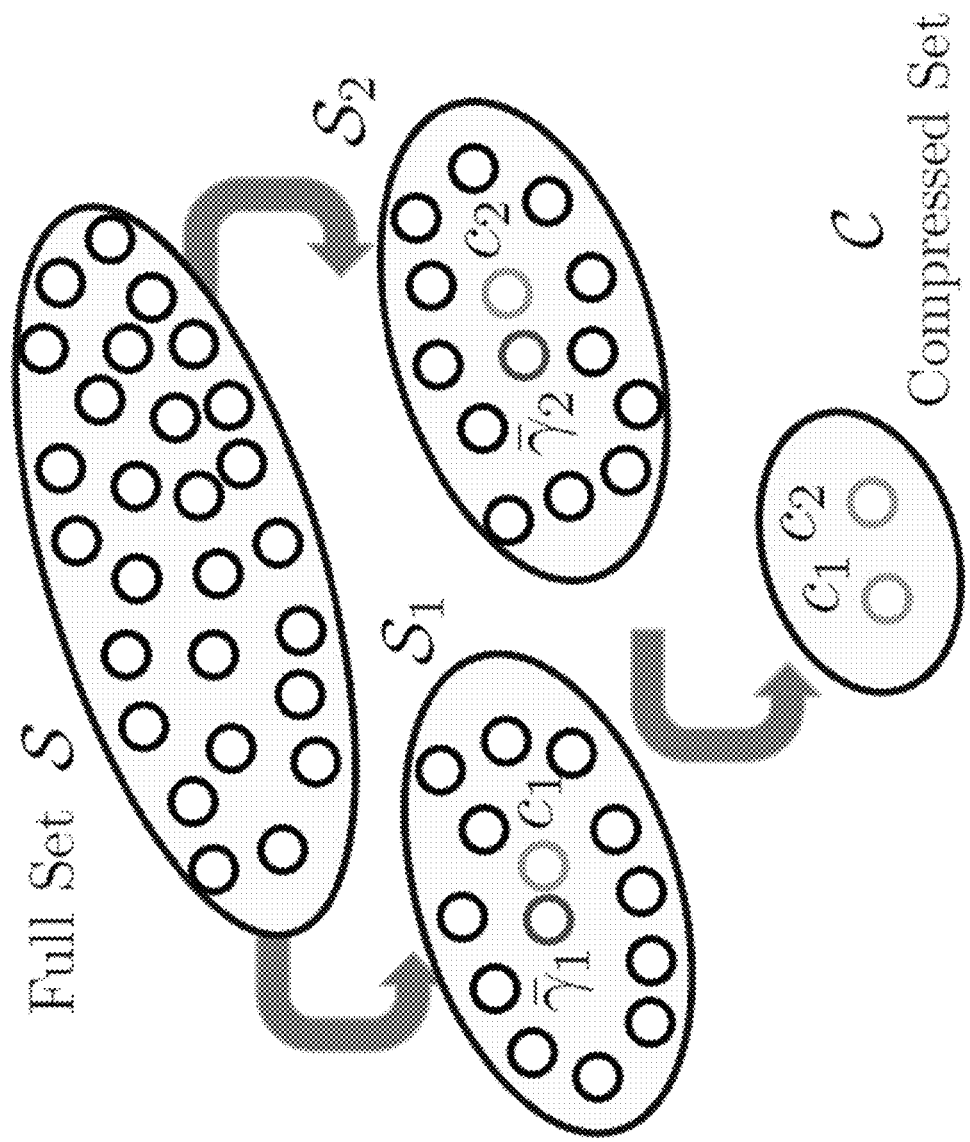
FIG. 21 shows a symbolic example of compression of the number of samples into clusters that can be used to create a sparse preconditioner for training a support vector machine using Schur decomposition.

FIG. 21 shows a symbolic example of compression of the number of samples into clusters that can be used to create a sparse preconditioner for training a support vector machine using Schur decomposition. As shown, samples can be grouped based on similarity, and representative samples from each group can be used to generate a preconditioner for finding a solution to the support vector machine optimization problem.

Note that although micro-well sensors were described herein, various other types of configurations of liquid crystals can be used to sense various different types of chemicals, and similar techniques can be used to classify the responses of those sensors. For example, as described in Abbott et al. U.S. Pat. No. 6,284,197 (which is hereby incorporated herein by reference in its entirety), a sensor can be formed using liquid crystals in contact with self-assembling monomers (SAMs) where the liquid crystals change orientation in the presence of certain chemicals. In such an example, images of the sensors when exposed to different chemicals that cause similar reactions in the sensors can be used to train a classification model (e.g., as described above in connection with FIGS. 1-8) to classify which chemical the sensor was exposed to. Abbott et al. U.S. Pat. No. 7,135,143 (which is hereby incorporated herein by reference in its entirety), describes other techniques using sensor that can be formed using liquid crystals in contact with self-assembling monomers (SAMs) where the liquid crystals change orientation in the presence of certain chemicals.

As another example, as described in Abbott et al. U.S. Pat. No. 7,910,382 (which is hereby incorporated herein by reference in its entirety), a sensor can be formed using liquid crystals that interface with an aqueous phase at a membrane containing a polymerized target of a bioagent, where the orientation of the liquid crystals at the aqueous phase change when the bioagent is present in the aqueous phase. In such an example, images of the sensors when exposed to different chemicals that cause similar reactions in the sensors can be used to train a classification model (e.g., as described above in connection with FIGS. 1-8) to classify which chemical the sensor was exposed to.

As yet another example, as described in Abbott et al. U.S. Pat. No. 7,990,488 (which is hereby incorporated herein by reference in its entirety), sensors can be formed using liquid crystal in a holding compartment of a substrate over which an aqueous solution can be passed. Such sensors can detect interactions at biomimetic interfaces with liquid crystals, which can cause the appearance of the sensor to change. Such sensors can, in a particular example, facilitate detection of binding of proteins and/or other biological molecules (and their assemblies) to liquid crystal-aqueous interfaces. As another particular example, such sensors can facilitate detection of other molecular transformations effected by biological molecules (e.g., catalytic transformations that involve the formation or breaking of a covalent bond).

As still another example, as described in Abbott et al. U.S. Pat. No. 9,080,973 (which is hereby incorporated herein by reference in its entirety), sensors can be formed using droplets of liquid crystals suspended in an aqueous phase that are ordinarily in a bipolar phase, but switch to a radial phase in the presence of certain chemicals, which can lead to a visual change in appearance of the droplets. In such an example, images of the sensors when exposed to different chemicals that cause similar reactions in the sensors can be used to train a classification model (e.g., as described above in connection with FIGS. 1-8) to classify which chemical the sensor was exposed to.

As a further example, as described in Abbott et al. U.S. Patent Application Publication No. 2016/0178588 (which is hereby incorporated herein by reference in its entirety), sensors can be formed using liquid crystals that are doped with a chiral molecule which can induce a helical distortion into the liquid crystal. In the presence of certain chemicals the chiral doped liquid crystal can self-assemble into a cubic lattice, dramatically changing its appearance, and in some cases diffracting visible light to cause the lattice to appear to change color (e.g., to a blue or green appearance). In such an example, images of the sensors when exposed to different chemicals that cause similar reactions in the sensors can be used to train a classification model (e.g., as described above in connection with FIGS. 1-8) to classify which chemical the sensor was exposed to. Note that although this disclosure mostly describes mechanisms for detecting the presence of a particular chemical, sensors using liquid crystals can be configured to change appearance with a dose response which can be used to distinguish the amount of exposure to a particular chemical (e.g., over a period of minutes, hours, days, etc.), and similar techniques can be used to distinguish the amount of chemical that has been absorbed from the environment, which may otherwise be difficult for a human to do. Additionally, although the disclosure generally describes detecting the presence of a chemical this should not be construed as limiting the disclosure to the detection of molecules (or atoms) that are typically characterized as "chemicals." Rather, liquid crystal sensors can be configured to detect the presence of many types of analytes, such as biological substances (e.g., including enzymes), biological organisms, and/or other substances which may not typically be described as being a chemical.

In some embodiments, any suitable computer readable media can be used for storing instructions for performing the functions and/or processes described herein. For example, in some aspects, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 4 to 6 can be executed or performed in any order or sequence not limited to the order and sequence shown and described in the figures. Also, some of the above steps of the processes of FIGS. 4 to 6 can be executed or performed substantially simultaneously where appropriate or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for detecting the presence of an analyte, the method comprising:
    capturing an image of liquid crystals;
    determining a first set of one or more features based on the brightness of pixels in the image;

determining a second set of features based on the image of the liquid crystals,
   wherein the second set of features comprises a plurality of outputs of a hidden layer of a trained object detection deep learning convolution neural network that was provided with values based on the pixels in the image as an input;
concurrently providing at least the first set of one or more features and the second set of features to a trained support vector machine,
   wherein the support vector machine was trained using features based on images captured of other liquid crystals when exposed to a first analyte and the other liquid crystals when exposed to a second analyte; and
receiving an indication from the support vector machine indicating whether the liquid crystals have been exposed to the first analyte.

2. The method of claim 1, wherein the second set of features are based on a color image of the liquid crystals, and wherein the first set of one or more features are based on a grayscale image of the liquid crystals.

3. The method of claim 1, further comprising:
generating a normalized RGB image from the first image of the liquid crystals;
converting the normalized RGB image to a grayscale image;
calculating a plurality of oriented gradients using the grayscale image; and
calculating a histogram of the plurality of oriented gradients, wherein the one or more features comprises values from the histogram of the plurality of oriented gradients.

4. The method of claim 3, wherein the normalized RGB image is generated from a portion of the image of the liquid crystals, wherein the normalized RGB image has a lower resolution than the image of the liquid crystals.

5. The method of claim 1, wherein the first analyte is a gas phase analyte and the second analyte is a non-targeted gas phase molecule.

6. The method of claim 5, wherein the first analyte is DMMP and the second analyte is water vapor.

7. The method of claim 6, wherein the analyte to be detected is sarin.

8. The method of claim 1, wherein the first analyte is a liquid phase analyte and the second analyte is a non-targeted liquid phase analyte.

9. The method of claim 8, wherein the first analyte is a biological analyte.

10. The method of claim 1, wherein the liquid crystals are disposed within a micro-well.

11. The method of claim 1, wherein the liquid crystals are in contact with self-assembling monomers.

12. The method of claim 1, wherein the liquid crystals are in contact with a polymerized target of a bioagent.

13. The method of claim 1, wherein the liquid crystals form at least one droplet suspended in an aqueous phase.

14. The method of claim 1, wherein the liquid crystals are disposed within a holding compartment of a substrate over which an aqueous solution is being passed.

15. The method of claim 1, wherein the liquid crystals are doped with a chiral molecule.

16. A system for detecting the presence of an analyte, the system comprising:
an image sensor; and
a processor that is programmed to:
   cause the image sensor to capture an image of liquid crystals;
   convert the image of the liquid crystals to grayscale;
   determine a first set of one or more features based on the brightness of pixels in the grayscale image;
   determine a second set of features based on the image of the liquid crystals,
      wherein the second set of features comprises a plurality of outputs of a hidden layer of a trained object detection deep learning convolution neural network that was provided with values based on the pixels in the image as an input;
   concurrently provide at least the first set of one or more features and the second set of features to a trained support vector machine,
      wherein the support vector machine was trained using features based on images captured of other liquid crystals when exposed to a first analyte and the other liquid crystals when exposed to a second analyte; and
   receive an indication from the support vector machine indicating whether the liquid crystals have been exposed to the first analyte.

17. A non-transitory computer readable medium containing computer executable instructions that, when executed by a processor, cause the processor to perform a method for detecting the presence of an analyte, the method comprising:
capturing an image of liquid crystals;
converting the image of the liquid crystals to grayscale;
determining a first set of one or more features based on the brightness of pixels in the grayscale image;
determining a second set of features based on the image of the liquid crystals,
   wherein the second set of features comprises a plurality of outputs of a hidden layer of a trained object detection deep learning convolution neural network that was provided with values based on the pixels in the image as an input;
concurrently providing the one or more features to a trained support vector machine,
   wherein the support vector machine was trained using images captured of other liquid crystals when exposed to a first analyte and the other liquid crystals when exposed to a second analyte; and
receiving an indication from the support vector machine indicating whether the liquid crystals have been exposed to the first analyte.

* * * * *